United States Patent
Kim

(10) Patent No.: US 11,276,029 B1
(45) Date of Patent: Mar. 15, 2022

(54) COMMUNITY BASED FULFILLMENT

(71) Applicant: Project Noa, Inc., Brea, CA (US)

(72) Inventor: Paul Dohyung Kim, Brea, CA (US)

(73) Assignee: PROJECT NOA, INC., Miami, FL (US)

( * ) Notice: Subject to any disclaimer, the term of this patent is extended or adjusted under 35 U.S.C. 154(b) by 0 days.

(21) Appl. No.: 17/219,239

(22) Filed: Mar. 31, 2021

Related U.S. Application Data

(63) Continuation-in-part of application No. 17/115,337, filed on Dec. 8, 2020.

(51) Int. Cl.
| | |
|---|---|
| G06Q 10/00 | (2012.01) |
| H04W 4/00 | (2018.01) |
| G06Q 10/08 | (2012.01) |
| H04W 4/02 | (2018.01) |
| H04W 4/029 | (2018.01) |
| G06Q 10/02 | (2012.01) |

(52) U.S. Cl.
CPC ........ *G06Q 10/0836* (2013.01); *G06Q 10/02* (2013.01); *G06Q 10/0838* (2013.01); *H04W 4/023* (2013.01); *H04W 4/029* (2018.02)

(58) Field of Classification Search
CPC ............... G06Q 10/00–50/00; H04W 4/00
USPC .............................................. 705/7.11–7.42
See application file for complete search history.

(56) References Cited

U.S. PATENT DOCUMENTS

| | | | |
|---|---|---|---|
| 9,225,676 B1 | 12/2015 | Shoham et al. | |
| 9,400,975 B2 | 7/2016 | Griffin et al. | |
| 9,916,557 B1 | 3/2018 | Gillen et al. | |
| 9,928,540 B1* | 3/2018 | Gerard | G06Q 30/0635 |
| 10,380,535 B1 | 8/2019 | Arora et al. | |
| 2013/0253969 A1* | 9/2013 | Das | G06Q 10/06 705/7.13 |
| 2014/0149244 A1 | 5/2014 | Abhyanker | |
| 2014/0297743 A1* | 10/2014 | Zyto | G06Q 10/06311 709/204 |
| 2015/0178312 A1* | 6/2015 | Pant | H04W 4/027 707/722 |
| 2015/0278892 A1 | 10/2015 | Roy | |
| 2016/0063435 A1* | 3/2016 | Shah | G06Q 20/42 705/44 |
| 2016/0247105 A1* | 8/2016 | Vaze | H04M 15/8033 |
| 2019/0347743 A1 | 11/2019 | Ponce et al. | |
| 2019/0356641 A1 | 11/2019 | Isaacson et al. | |
| 2021/0133855 A1 | 5/2021 | Ramirez | |

OTHER PUBLICATIONS

U.S. Appl. No. 17/115,337, Advisory Action dated Aug. 5, 2021, 3 pgs.

(Continued)

*Primary Examiner* — Alan S Miller
*Assistant Examiner* — Mustafa Iqbal
(74) *Attorney, Agent, or Firm* — Kwan & Olynick LLP

(57) ABSTRACT

Described herein is a relationship based fulfillment system. Such a system may provide on-demand product fulfillment by personal and/or social contacts of a purchaser. The system may utilize the personal contacts and/or relationships of a user, as indicated through various contact databases or social groups of the user, to connect the user to various potential partners for providing relationship based fulfillment of products that are purchased by the user or performance of other relationship based services.

20 Claims, 22 Drawing Sheets

(56) References Cited

OTHER PUBLICATIONS

U.S. Appl. No. 17/115,337, Examiner Interview Summary dated Apr. 2, 2021, 2 pgs.
U.S. Appl. No. 17/115,337, Final Office Action dated Apr. 30, 2021, 9 pgs.
U.S. Appl. No. 17/115,337, Notice of Allowance dated Sep. 21, 2021, 9 pgs.
U.S. Appl. No. 17/240,889, Non-Final Office Action dated Jul. 22, 2021, 28 pgs.

* cited by examiner

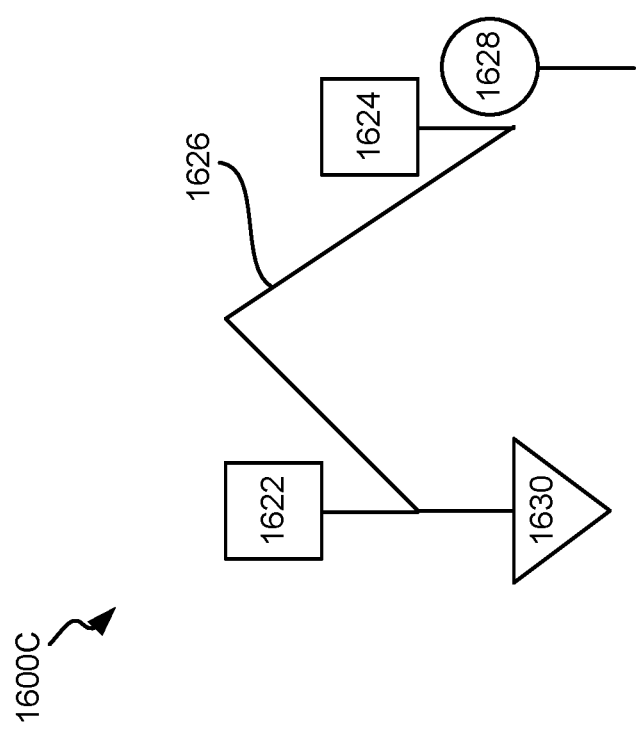

COMMUNITY BASED FULFILLMENT

CROSS-REFERENCE TO RELATED APPLICATION

This patent document is a continuation-in-part of and claims the benefit of priority under 35 U.S.C. § 120 of U.S. patent application Ser. No. 17/115,337, titled "Relationship Based Fulfillment Systems and Methods," by Paul Kim, filed Dec. 8, 2020, which is hereby incorporated by reference in its entirety for all purposes.

BACKGROUND

Orders placed through the internet continue to grow in volume. Fulfillment of such orders is typically through a fulfillment center hub that provides goods for delivery of ordered items. Such fulfillment hubs are centralized, require complicated inventory tracking techniques in order to operate efficiently, and costly. The cost and complexity of operating such fulfillment systems results in only a few large companies being able to afford the scale and complexity of such fulfillment models. Furthermore, the delivery experience is impersonal and often done without care, resulting in regular occurrences of lost or damaged items.

SUMMARY

Described are methods and systems for relationship based fulfillment. In a certain embodiment, a system may be provided. The system may include a gateway, communicatively coupled to a network and configured to receive application data from user devices of user members, a location module, configured to receive location data from the user devices of the user members, a user database, configured to store user data associated with the user members, a group database, configured to store group data, the group data directed to one or more association groups, each of the association groups including a plurality of user members, an association database, configured to store association data, the association data indicating relationships between one or more association groups and one or more user members, where the association data is determined and periodically updated based on application data and/or location data, and a processor, communicatively coupled to the gateway, the user data, the group database, the association database, and the location module. The processor may be configured to perform operations that include receiving, with the gateway from a first user device associated with a first user, a first pick-up request, where the first pick-up request is associated with a first location, and where the first user is one of the user members, receiving, with the location module, location data associated with a plurality of other user members, determining, with the processor and from the location data, a predicted location for each of the plurality of other user members, determining, with the processor and based on the predicted location, a potential pick-up group including a portion of the plurality of the other user members, determining, with the processor and from the association data, relationship ratings between the first user and each of the user members of the potential pick-up group, determining, with the processor, a pick-up cost for each of the user members of the potential pick-up group, determining, with the processor and based on the pick-up costs, a first pick-up group from the user members of the potential pick-up group, and providing, with the gateway, pick-up fulfillment data to electronic devices associated with each of the user members of the first pick-up group.

In another embodiment, an system may be provided. The system may include a gateway, communicatively coupled to a network and configured to receive application data from user devices of user members, a location module, configured to receive location data from the user devices of the user members, a user database, configured to store user data associated with the user members, a group database, configured to store group data, the group data directed to one or more association groups, each of the association groups including a plurality of user members, an association database, configured to store association data, the association data indicating relationships between one or more association groups and one or more user members, where the association data is determined and periodically updated based on application data and/or location data, and a processor, communicatively coupled to the gateway, the user data, the group database, the association database, and the location module. The processor may be configured to perform operations including receiving, with the gateway and from a first user device associated with a first user, a first pick-up request, where the first pick-up request is associated with a first location, and where the first user is one of the user members, receiving, with the gateway, availability data from a first group of electronic devices associated with a first plurality of other user members, where the first group is associated with a first area, and where the first area is associated with the first location, determining, with the processor, a predicted location for each of the user members of the first group, determining, with the processor and based on the predicted location, a pick-up cost for each of the user members of the first group, determining, with the processor and based on the pick-up costs, a second group from the user members of the first group, and providing, with the gateway, pick-up fulfillment data to electronic devices associated with each of the user members of the second group.

Illustrative, non-exclusive examples of inventive features according to the present disclosure are described herein. These and other examples are described further below with reference to figures.

BRIEF DESCRIPTION OF THE DRAWINGS

The disclosure may best be understood by reference to the following description taken in conjunction with the accompanying drawings, which illustrate various embodiments.

FIGS. 16A-C illustrate examples of relationship based fulfillment recommendations based on disturbances to daily routine, in accordance with some embodiments.

DETAILED DESCRIPTION

In the following description, specific details are set forth to provide illustrative examples of the systems and techniques described herein. The presented concepts may be practiced without some, or all, of these specific details. In other instances, well known process operations have not been described in detail to avoid unnecessarily obscuring the described concepts. While some concepts will be described with the specific examples, it will be understood that these examples are not intended to be limiting.

Some implementations of the disclosed systems, apparatus, methods and computer program products are configured for implementing a relationship based fulfillment system. As described in further detail below, such a system may provide an environment where on-demand product fulfillment is provided by personal and/or social contacts of a purchaser. The described techniques allow for resource efficient determination of appropriate personal and/or social contacts to provide for such fulfillment. In various embodiments, the techniques described herein may utilize the personal contacts and/or relationships of a user, as indicated through various contact databases or social groups of the user.

Figure 1:
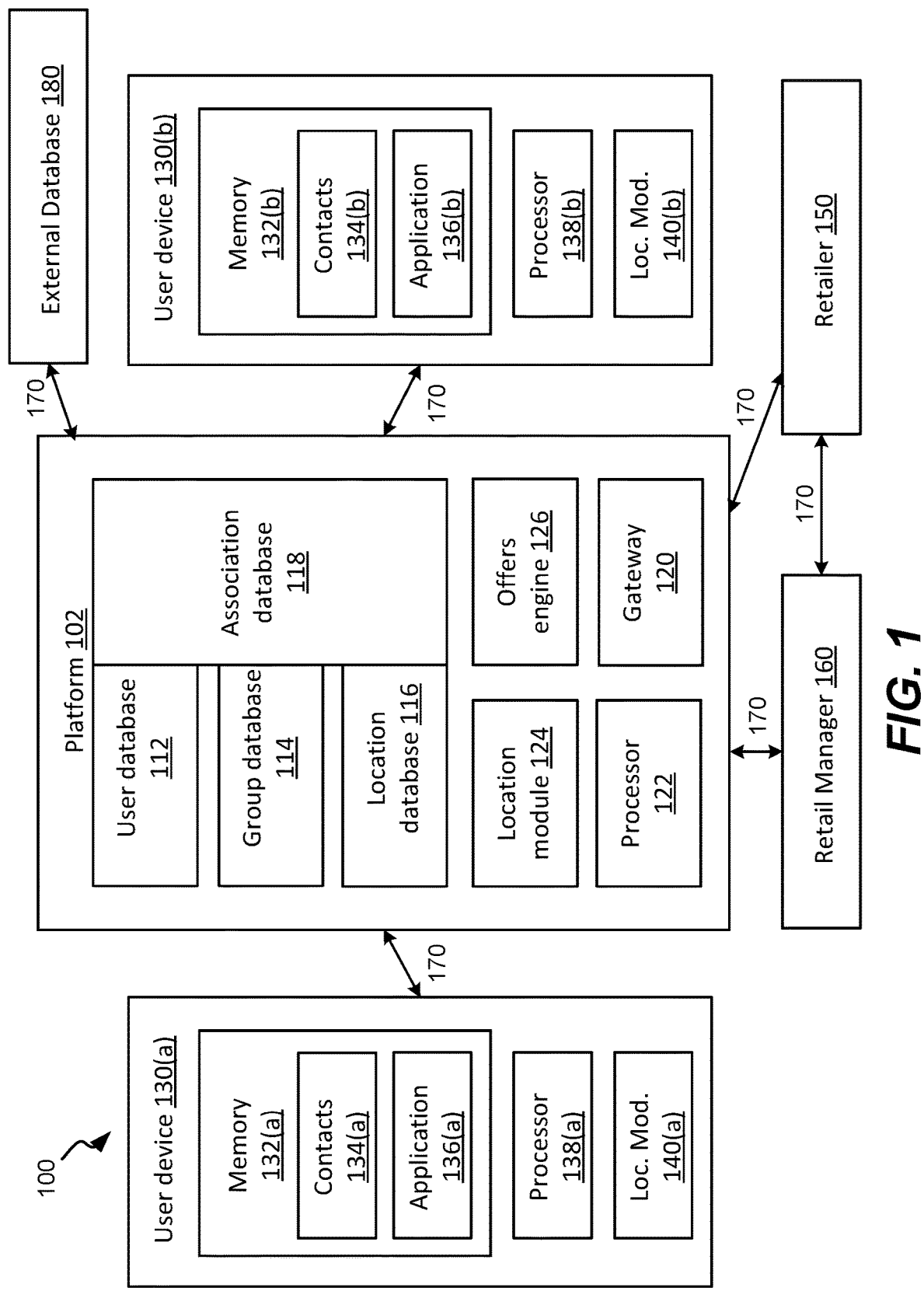
FIG. 1 illustrates a block diagram of an example system for relationship based fulfillment, in accordance with some embodiments.

FIG. 1 illustrates a block diagram of an example system for relationship based fulfillment, in accordance with some embodiments. FIG. 1 illustrates system 100 that includes a plurality of user devices, such as user devices 130(a) and 130(b), platform 102, external database 180, retailer 150, and retailer manager 160. Some or all of the various components described herein may be implemented with a combination of processors, memories, and APIs.

User devices 130(a) and/or 130(b) may be electronic devices of various users. Such users may be, for example, purchasers of items (e.g., requesting users) and/or potential delivering users for such items. In various embodiments, user devices 130(a) and/or 130(b) may be, for example, desktop computing devices, portable computing devices (e.g., laptops, tablets, smartphones, and/or other electronic devices), wearable devices, and/or other such electronic devices. Reference may be made herein to a user device "130" with associated components. It is appreciated that such reference may be to one or both of user devices 130(a) and 130(b), as well as other user devices.

Each user devices 130, whether 130(a) or 130(b), may include memory 132, processor 138, and location module 140. Processor 138 may be configured to perform one or more operations of the techniques described herein. Processor 138 may be any type of single or multi-core processor that allows for electronic data processing.

Location module 140 may be configured to determine a location of user device 130. In various embodiments, location module 140 may be, for example, a global positioning system (GPS) device, an accelerometer, a gyroscope, a signal triangulation device, and/or another such device that allows for determination of a location of user device 130. In various embodiments, one or more techniques may be used individually or in combination to determine the location of user device 130. Location module 140 may be configured to generate location data indicating the location of user device 130. Such location data may be communicated to other devices (e.g., platform 102) via network 170.

Memory 132 may be any type of memory device configured to store data and/or instructions. Memory 132 may be, for example, a harddrive, a solid state device, and/or random access memory (RAM) and may include transitory or non-transitory computer-readable media. Memory 132 may be configured to store contacts 134 and/or application 136.

Application 136 may be stored within memory 132. Application 136 may be, for example, an application configured to allow a user to shop from various retailers (e.g., from brick and mortar retailers) and request "last-mile" delivery of items purchased, as described herein (e.g., through relationship based fulfillment). Additionally or alternatively, application 136 may allow users to provide such fulfillment for others, as described herein. In various embodiments, application 136 may be configured to provide recommendations for potential delivering users and/or delivery opportunities based on the social contacts of the user. Thus, for example, application 136 may interface with contacts and/or other social based applications of user device 130 and determine social contacts of the user of user device 130. As such, for example, application 136 may log-in or share data with such social based applications and determine the contacts of the user accordingly.

Such social contacts may form the pool of potential partners that user device 130 provides to fulfilling certain tasks. Additionally or alternatively, application 136 may provide instructions to platform 102 to determine one or more social contacts appropriate for certain tasks and/or receive data directed to possible tasks for the user. In certain embodiments, application 136 may provide data to and/or receive data from platform 102. Thus, for example, application 136 may provide contacts 134 to platform 102 for use in performance of the techniques described herein.

Contacts 134 may be, for example, one or more social or group related contacts of the user. Thus, for example, contacts 134 may include contacts from a contact list stored within user device 130 (e.g., a phone number contact list or a contact list storing contacts in other ways). Contacts 134 may also include contacts not stored within a contact list of user device 130, such as contacts that the user has interacted with (e.g., called, messaged, or otherwise interacted with) that has not been stored in a contact list.

Contacts 134 may further include, for example, members of one or more groups (e.g., interest or social media groups) that the user is a member of. In various embodiments, membership within such groups may be determined by the user (e.g., the user may affirmatively join such groups) or may be determined automatically and/or suggested to the user (e.g., based on movement of the user and/or information consumed by the user, groups may be suggested to the user or the user may be automatically enrolled into such groups). In certain such embodiments, contacts 134 may, for example, be provided to platform 102 through network 170. In various embodiments, contacts 134 may be directly provided to platform 102 from user device 130, downloaded onto user device 130 temporarily before being provided to platform 102, and/or obtained from other services by platform 102 (e.g., through connections between platform 102 and various social media platforms that the user is a member of). Thus, for example, application 136 may obtain permissions or credentials to access a user account on external database 180, which may be, for example, a social media or other such account of the user, and communicate such permissions or credentials to platform 102. Platform 102 may accordingly access external database 180 from such permissions or credentials.

Network 170 may be any wired or wireless communications connection that allows for data to be sent. Network 170 may be, for example, a wired Ethernet connection or a wireless connection such as WiFi, 3G, 4G, 5G, or another such connection that allows for data to be transmitted. In various embodiments, the various components of the systems described herein may utilize one, some, or all of such data connections to communication and/or receive data.

Platform 102 includes user database 112, group database 114, location database 116, association database 118, location module 124, offers engine 126, processor 122, and gateway 120. The various components of platform 102 may be implemented on a server and/or on the cloud. In certain embodiments, the implementations may be via a combination of Docker containers, Kubernetes, and/or other container architectures.

Processor 122 may be a single or multi-core processor, as described herein, configured to allow for platform 102 to perform the operations described herein. In various embodiments, platform 102 may be associated with a plurality of user accounts (e.g., the users of user devices 130(*a*) and 130(*b*)) and may perform operations to carry out the techniques described herein for such account holders. As such, each of user devices 130(*a*) and 130(*b*), as well as various other user devices, may be associated with platform 102.

Location module 124 may be configured to receive location data from location module 140 of user device 130. Location module 124 may, thus, receive GPS, accelerometer, or other positional data indicating the location of user device 130.

Location module 124 thus allows for determination of the location of various user devices (e.g., user devices 130(a) and 130(b)) that are associated with platform 102 (e.g., the user devices of users that have accounts associated with platform 102).

In various embodiments, location module 124 may be associated with one or more third party location services (e.g., various map services that provide locations of merchants and/or other parties). In such embodiments, location module 124 may be integrated with such third party location services and may, accordingly, provide and receive data (e.g., data indicating the locations of various merchants) from such third party location services.

Gateway 120 may be a gateway configured interface with various applications or programs of users, merchants, third parties (e.g., social media platforms), and/or other parties. Thus, for example, gateway 120 may be configured to interface with retailer 150, retailer manager 160, user devices 130(*a*) and/or 130(*b*) (e.g., via application 136(*a*) and/or 136(*b*)), and/or external database 180. Gateway 120 may, in certain embodiments, be an API gateway. As such, data communicated between platform 120 and retailer 150, retailer manager 160, user devices 130(*a*) and/or 130(*b*), and/or external database 180 may be provided through an API gateway. In certain embodiments where gateway 120 is an API gateway, gateway 120 may allow for integration with other APIs and/or programs. As such, the techniques described herein may be incorporated within various APIs and such APIs may be integrated with platform 102 as well as other platforms (e.g., third party platforms).

Retailer 150 may, for example, a merchant or other item provider. Retailer 150 may include a merchant device such as an electronic device configured to communicate data with platform 102. Retailer 150 (e.g., the electronic device associated with the retailer) may, for example, be configured to receive orders from platform 102. Such orders may, for example, originate from user device 130(*a*) and/or 130(*b*).

Retail manager 160 may be an application or electronic device configured to coordinate various orders or shipments from various users. Retail manager 160 may, thus, allow retailer 150 to configure a store associated with retailer 150, create and/or list products, conduct marketing campaigns, manage orders and/or aid in performing fulfillment of the orders, and/or provide updates. In certain embodiments, retail manager 160 may be a seller management dashboard configured to scale and shorten the onboarding schedule for retailer 150 to register with or be associated with platform 102. Retail manager 160 may configure a portal for user device 130 to search for localized product inventory and obtain product data as well as be configured to provide a seller management tool (i.e., inventory updates and marketing efforts) for retailer 150.

Accordingly, for example, retail manager 160 may be configured to create a new product listing or update an existing product listing, create a marketing campaign that includes one or more of campaign type, bids, products, and/or other aspects of the marketing campaign. Retail manager 160 may additionally be configured to allow retailer 150 to determine their orders, organize their orders based on one or more states (e.g., organizing by "pending" orders may provide an output of orders based on their fulfilled states), search for specific orders (e.g., based on order ID, product data, customer, and/or another aspect), update order status, update product data, inventory status, order status, and/or marketing campaigns by bulk, and/or control other aspects associated with product listings.

In certain embodiments, retail manager 160 may coordinate retail of items of retailer 150 on platform 102. As such, platform 102 may allow users to purchase items for sale from retailer 150. Retail manager 160 in such an embodiment may coordinate storage on platform 102 of product data and the providing of the product data to user device 130. Retail manager 160 may further coordinate inventory management, order processing, fulfillment processing, and marketing.

Returning to platform 102, platform 102 may include one or more databases. Such databases may include, for example, user database 112, group database 114, location database 116, and/or association database 118. Such databases may stored data in the form of hard drive, solid state drives, and/or other memory storage devices. Each of user database 112, group database 114, location database 116, and/or association database 118 may be stored within separate physical devices or one or more such databases may share a storage medium. In various embodiments, the databases described herein may be organized in a manner that allows for faster retrieval of data from such databases. Furthermore, the databases may be structured to allow for more convenient cross referencing to other databases, for when determinations require a plurality of factors.

User database 112 may be a database configured to store user account information and related social contact information. Thus, for example, user database 112 may be structured to associate social contacts with a specific user. As such, user database 112 may include, for example, phone, social, and/or e-mail contacts of the user (e.g., from user device 130). Such contacts may be contacts that the user has a pre-existing relationship with. For example, such contacts may be contacts that the user has had previously documented contact with (e.g., through social media, phone calls, or message). In another example, even if no previously documented contact exists, users and contacts that are associated with one or more of the same location may be considered to be contacts. Such locations may be, for example, the same city, county, neighborhood, and/or another such location. Additionally or alternatively, relationships may be determined through other techniques that do not involve direct social contact, such as determining whether the user and contact are associated with the same school, church, workplace, hobby, and/or other such characteristics. In such embodiments, user database 112 may receive data from user device 130 and store the contacts of user device 130 within user database 112 while associated with the user. Storing the contacts of the user within user database 112 allows for quicker determination of potential delivering users from the social contacts of the user.

In certain embodiments, users within user database 112 may form the pool of both requesting users and delivery users. That is, unlike techniques that provide separate status for customers and service providers, each member within user database 112 may both request service and provide service. User data appropriate for both requesting and providing service may be accordingly stored within user database 112. When requesting service, such user data may allow for determination of potential delivery users that are appropriate for providing service to the requesting user. Additionally, such user data may allow for matching of a user as a potential service provider to another user requesting relationship based fulfillment. Such a configuration saves memory and allows for more flexible determination of potential service providers. Additionally, such a configuration allows for a larger pool of potential service providers according to the techniques described herein.

In various embodiments, the social contacts of a specific user stored within user database 112 may be categorized according to tiers. Thus, for example, a contact that the user often is in contact with may be categorized in a first tier, a contact that the user has occasional contact with may be categorized in a second tier, a contact that the user is rarely in contact with may be categorized in a third tier, and a contact that the user has only had contact with once may be categorized in a fourth tier. Such tier categorization may be determined for groups associated with the user as well. The categorization may aid platform 102 in matching the user with appropriate potential delivering users.

Group database 114 may be a database configured to store groups associated with the user. Such groups may be, for example, interest groups of the user or groups that the user may be interested in (e.g., based on social history of the user, such as locations that the user frequents). In various embodiments, the data of group database 114 may be at least partially obtained from various social media platforms that the user is a member of. Such data may be obtained from user device 130 and/or external database 180. Thus, for example, group database 114 may obtain permissions or credentials to interface with one or more social media accounts of the user. Group database 114 may then, for example, obtain the groups that the user is a member of, typical hashtags used by the user and/or members of that group and/or that the user will respond to, and/or other indications of interest from the user. Group database 114 may then store such groups, the interest or subject of such groups, members within such groups, the level of interest of the user of the group (e.g., based on the number of interactions that the user has per unit time with the group), and/or other aspects of the groups while associating such aspects with the user. In certain embodiments, such associations may be separately stored within association database 118.

Location database 116 may be a database configured to store data related to locations of the user and/or businesses (e.g., of retailer 150). Thus, location database 116 may receive data indicating where the user is during the day and may then store data that may indicate the likelihood of the user at a specific area during a time of day. Furthermore location database 116 may include data directed to locations of retailer 150. Thus, location database 116 may include data directed to one or more physical locations (e.g., stores) of retailer 150. Furthermore, location database 116 may include data directed to various establishments nearby the physical locations of retailer 150, such as their address, items or category of items offered for sale, their hours of operations, and/or other data.

Association database 118 may be a database separate from user database 112, group database 114, and/or location database 116 or may be integrated within such databases. Association database 118 may indicate the relationship between the various users, groups, and/or locations. As such, for example, data within association database 118 may receive the social contacts of a user stored within user database 112 and provide the related groups associated with each of those social contacts with data from group database 114. Additionally or alternatively, association database 118 may provide the locations of such social contacts or where the social contacts typically are at during a time of day. Thus, association database 118 may allow for various databases to access data stored within other databases, as needed, while maintaining separate databases. The maintenance of separate databases saves memory, allowing for more efficient storage of data, and allows for faster processing as data entry within the databases may be bereft of unnecessary information.

As contacts and other information stored may be sensitive information, the database structure of FIG. 1, with user, group, and location data separated, provides for more secure storage of user data. Furthermore, association database 118 may include data that cross references users, groups, and their locations. Data from separate association database 118 may thus be utilized to "piece together" the data of databases 112, 114, and 116. The data of association database 118 may refer to various data from databases 112, 114, and 116 and their relationships thereof, but such data may be encrypted or otherwise structured to not be useful on its own. As such, sensitive relationships and associations may be stored in a manner that provides for greater security.

Offers engine 126 may be used to provide and maintain special offers for various users of platform 102. Offers engine 126 may, based on data associated with such users, generate and maintain a special offer infrastructure (e.g., coupons, discounts, promotion codes, etc.) for the users. Offers engine 126 may provide special offers directly to users, for example, on special occasions such as birthdays, anniversaries, holidays, and/or other times. The offers may be associated with various retailers such as retailer 150.

Figure 2A:
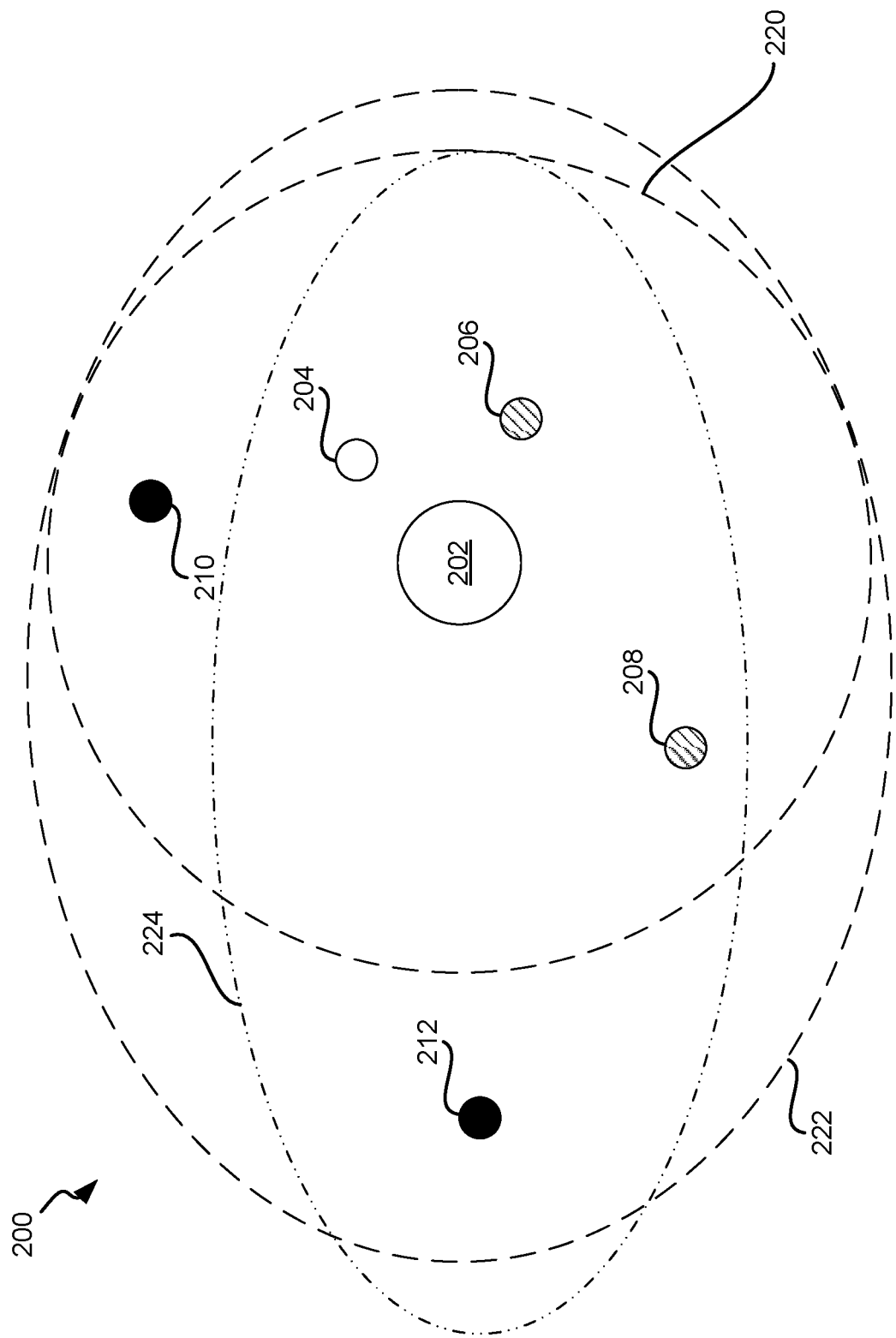
FIG. 2A illustrates an example of relationship based fulfillment, in accordance with some embodiments.

FIG. 2A illustrates an example of relationship based fulfillment, in accordance with some embodiments. While the current disclosure describes examples in the context of fulfillment, it is appreciated that other embodiments of relationship based tasks may be used in place of fulfillment. Thus, additional or alternative to fulfillment, the techniques described herein may be used for requesting the performance of tasks, running of errands (e.g., pick up of pets or children), and/or other such tasks.

FIG. 2A illustrates example 200 that includes retailer 202, potential delivering users 204-212, and geofences 220, 222, and 224. In example 200, a requesting user may have purchased an item from retailer 202 and requested relationship based fulfillment of the purchased item. That, is, the requesting user may have purchased or may be about to purchase an item from retailer 202 and may be looking for fulfillment from a party that the user has a relationship or personal connection (e.g., shared interest) with. Such parties may include, for example, parties that the requesting user has had a relationship with or interacted with, parties within the same interest groups of the requesting user, and/or parties that the requesting user shares an interest with.

Potential delivering users may be determined based on their relationship to the requesting user, their distance to retailer 202, their distance from the requesting user's delivery address, and/or other such factors. In various embodiments, a platform such as platform 102 may presort potential delivering users based on one or more factors. Such factors may include, for example, the potential delivering user' daily schedule, ending location (e.g., place of residence), their current or planned activities, their mode of movement (e.g., driving, biking, walking, ride sharing, or another way they are moving), and/or their current or predicted future location.

Thus, for example, application 136 may include or interface with a user's schedule. That is, a user may provide a schedule to application 136 or application 136 may interface with a schedule stored on the user device. Determination of whether such a user would be appropriate as a delivering user may be based, at least, on schedule (e.g., whether the schedule of the user would take the user close to the place of residence of the requesting user, whether the user is free to provide such delivery, and/or other such factors).

In certain embodiments, the planned or scheduled activities of the user may be known from the schedule. Such planned or scheduled activities may include activity type and the location of the activities. Thus, the future locations of the user may be determined from such addresses. Furthermore, the activities may allow for a determination of appropriateness of requesting that the user provide for pick-up or fulfillment. For example, if the activity is "grocery shopping," that may indicate a high appropriateness for pick-up or relationship based fulfillment as the user may simply detour from the grocery store to another store within the same plaza. However, a user that is attending a business meeting may be less likely or appropriate to provide for relationship based fulfillment.

In other embodiments, daily trends of the user may be determined. Data from user device 130, such as location data (e.g., for determination of daily routes), schedule data, usage data of apps (e.g., payment apps, check-in apps, gaming apps), and/or other data may allow for determination of daily trends of a user. Machine learning and/or artificial intelligence may be utilized to determine the daily trends of the user. Accordingly, the likelihood of a user performing a certain activity and/or being within a certain area may be determined based on the daily trends.

Thus, for example, machine learning may be utilized to determine work, home, or other regularly visited locations of the user. Such determined locations may be refined and/or updated over time. Accordingly, for example, machine learning may be utilized to determine a location where the user typically ends their day (e.g., their home), and their typical daily travel routine (e.g., traveling to work and the work location for Monday to Friday and to church and the church location for Sunday). The machine learning may also be utilized to determine any changes to the routines and/or locations (e.g., if a user has moved home locations or switched work locations) based on periodically received location data from the user device.

Additionally or alternatively to daily schedule and daily trends, the ending location of the potential delivering user (e.g., the place of residence or the location that the delivering user ends the day at) may be utilized as a factor. Typically, a user starts and ends their day at the same spot; the place of residence. As such, platform 102 may at least expect any user to be near their place of residence by the end of the day. As such, any delivery to an address near the place of residence of the user may be considered to be more convenient and, thus, more likely to be offered and/or accepted by the user.

The mode of movement of the potential delivering user may also be determined. In certain embodiments, such modes may include driving, biking, walking, ride sharing, and/or other movement modes. In various embodiments, data from one or more sensors and/or other applications of user device 130 may be utilized to determine the mode of movement of the user. Thus, for example, location module 140 or an accelerometer, gyroscope, or microphone (e.g., to determine the environment around the user) of user device 130 may be utilized to determine if movement of the user is indicative of driving, biking, walking, or another form of movement. Data from other applications of user device 130 may also be utilized to determine the mode of movement of the user. As such, for example, data from a ride sharing application may indicate that the user is ride sharing.

Based on the mode of movement, the likelihood or appropriateness of the potential delivering user providing relationship based fulfillment may be determined. Thus, for example, if the delivery address is more than a threshold distance away (e.g., only within driving distance), a user that is determined to be walking or biking may be considered less appropriate. Furthermore, a destination that is far away from the user's end destination may be determined to be less appropriate for a ride share traveling user as such a delivery may incur additional costs.

Based on such factors, the likelihood or appropriateness for delivery may be determined. In certain embodiments, the likelihood or appropriateness for providing relationship based fulfillment may be determined by providing a calculation where various factors are weighed (e.g., given numerical weights and an appropriateness rating determined). Such weighting may be according to the considerations described herein, with greater weighting provided to more important factors or factors that cannot be changed (e.g., the movement mode of the user) and less weighting given to other factors (e.g., the current activity of the user). A relationship rating between the requesting user and the potential delivering user may also be determined and used as a factor for the appropriateness rating. As such, for example, the frequency or number of times that the requesting user and the potential delivering user contact each other, the length of each contact, indication of the closeness of the user from such contact (e.g., from machine learning), and/or other personal indications may be used. Factors that indicate a greater appropriateness or likelihood for delivery may increase the score, such as the user traveling by car, while factors that decrease the appropriateness or likelihood for delivery may decrease the score, such as the delivery address being far from the potential delivering user's ending location (e.g., place of residence).

Based on the likelihood or appropriateness for delivery, various possible potential delivery users may be determined and categorized. Thus, for example, users 210 and 212 may be considered to be very appropriate for providing potential relationship based fulfillment. Meanwhile, users 206 and 208 may be considered somewhat appropriate and user 204 may be considered not appropriate for providing potential relationship based fulfillment.

In certain embodiments, the locations of users, such as user 204-212, may be received by platform 102. In various embodiments, the locations of such users may be periodically received from the user devices of the users, constantly received, and/or received when allowed (e.g., when the user may be available for providing relationship based fulfillment). The user devices may provide location data to platform 102. In certain embodiments, platform 102 may receive such location data and determine one or more users appropriate for providing relationship based fulfillment of items. Platform 102 may offer a centralized service for such determinations, which may provide privacy protection to users and more efficient determination. Based on the location of the user devices, the likelihood or appropriateness for delivery may be further updated or a potential delivering user may be selected.

In various embodiments, one or more geofences may be present around the retailer of the item to be delivered or fulfilled. Thus, in example 200, geofence 220 and 222 may be established around retailer 202. Geofences 220 and 222 may be used to determine potential delivery users or select a potential delivery user.

Accordingly, initially, platform 102 may determine if there are any appropriate potential delivery users within geofence 220 around retailer 202. Platform 102 may identify user 210 as being very appropriate and within geofence 220. Platform 102 may then accordingly communicate a notification to the requesting user indicating that user 210 may be available for relationship based fulfillment and/or provide a notification to user 210 requesting whether they would be willing to accept a relationship based fulfillment opportunity. In various embodiments, the relationship between the requesting user and user 210 may be indicated within the request. Indicating such a relationship may, for example, establish trust between the user. The notification may be provided by, for example, a SMS message, an online message (e.g., through application 136 or one or more other messaging systems), and/or through another technique.

Based on the notification, user 210 may accept or reject the request for relationship based fulfillment. If user 210 accepts, relationship based fulfillment may be accordingly arranged as described herein. If user 210 rejects, a further candidate may be identified or suggested.

Thus, for example, platform 102 may determine that users 206 and 208, being somewhat appropriate users, may be potential relationship based fulfillment users. In such an example, platform 102 may, accordingly, first select or recommend user 206 as user 206 is closer to retailer 202.

Alternatively, platform 102 may expand the geofence and utilize geofence 222 to determine potential relationship based fulfillment users. As described herein, geofences may be of any appropriate shape. Thus, geofence 222 may be an oval shape compared to the circular shape of 220. The oval shape of geofence 222 may include a larger portion that is closer to the requesting user's residence or due to another geographic feature. Shaping the geofences in such a manner may allow for more efficient use of searching resources by, for example, only searching for potential relationship based fulfillment users within areas that will more likely return matches.

Based on geofence 222, platform 102 may determine that user 212 is very appropriate for providing relationship based fulfillment and is located within geofence 222. As such, larger geofence 222 allows for user 212 to be identified after user 210 has rejected the request for relationship based fulfillment. A further request may then be communicated to user 212.

In certain embodiments, a user may include their own geofence. For example, user 212 may include geofence 224. Geofence 224 may indicate the distance around user 212 suitable for user 212 to pick-up an item for relationship based fulfillment. In certain embodiments, retailer 202 may be required to be within geofence 224 in order for user 212 to accept pick-up from retailer 202. Accordingly, in certain embodiments, retailer 202 may need to be within geofence 224 of user 212 and user 212 may need to be within geofence 222 in order for user 212 to be determined to be appropriate for providing relationship based fulfillment for pick-up of an item from retailer 202.

In certain embodiments, geofences 220, 222, and 224, as well as other geofences described herein, may be refined over time. Thus, for example, machine learning models may refine the shape and/or size of geofences 220, 222, and/or 224. Refinement of geofences 220, 222, and/or 224 may be based on, for example, improvements in determining the daily habits of users (e.g., improved understanding of when a user goes to the gym during a month), changes in daily behaviors of users (e.g., changing of schedules of users), determination of traffic patterns (e.g., changing of geofences associated with certain locations based on traffic patterns to optimize the convenience of pick-up and/or delivery), changes in locations associated with users (e.g., moving of residences or workplaces), changes in the determination of movements of users (e.g., changes in the estimated speed of movement of users based on the determined mode of movement, such as when a user may be determined to have become a more passive or slower driver), and/or other such considerations. Accordingly, the accuracy or efficiency of geofences may be improved through the techniques described. Improvement within such geofences may improve the operation of server devices by more accurately identifying appropriate users and, thus, transmitting requests and/or other data to only users that are appropriate for providing relationship based fulfillment.

Figure 2B:
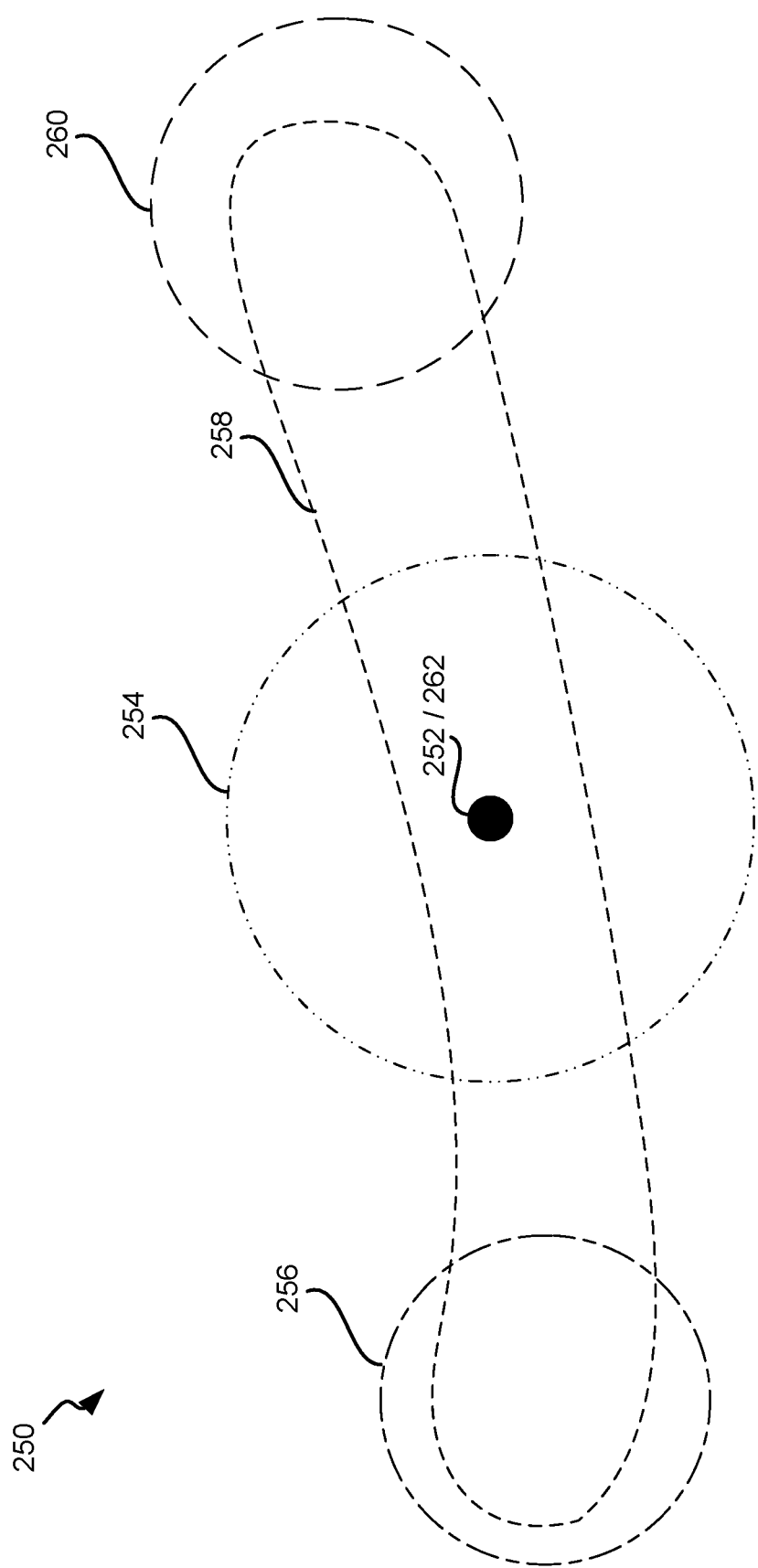
FIG. 2B illustrates another example of relationship based fulfillment, in accordance with some embodiments.

FIG. 2B illustrates another example of relationship based fulfillment, in accordance with some embodiments. FIG. 2B illustrates areas that user 252 may be associated with for providing relationship based fulfillment. In the embodiment of FIG. 2B, user 252 may be associated with one or more different areas and/or geofences at any one time, despite one, some, or all of those areas and/or geofences not being within close geographical vicinity of user 252.

Thus, for example, user 252 may be associated with geofences 254, 256, 258, and 260 while being located at location 262. In certain embodiments, geofences 254 to 260 may be areas where user 252 may be determined as a possible relationship based fulfillment candidate. Geofences 254 to 260 may be variously associated with user 252 and may or may not be around the immediate location of user 252.

In various embodiments, one, some, or all of geofences 254 to 260 may be utilized as appropriate areas for user 252 to provide relationship based fulfillment pick-up or delivery. Accordingly, geofences 254 to 260 may be one, some, or all of the areas that user 252 may pick up items from for relationship based fulfillment and/or may be one, some, or all of the areas that user 252 may provide delivery to for relationship based fulfillment.

For example, geofence 254 may be a geofence associated with the currently detected location of user 252. As such, geofence 254 may be located around the immediate location of user 252. Geofence 254 may be a geofence that is of a fixed or variable radius around location 262 and/or may be of another shape (e.g., rectangular, conforming to city streets, and/or another shape) and/or size around location 262.

Geofence 256 may be a geofence associated with a work location or other location associated with user 252. Thus, geofence 256 may be a geofence located around a work location of user 252. The work location of user 252 may be, for example, determined by information provided by user 252, from tracked movement data, from data provided by a third party, and/or from other data or techniques. The work location may be stored within user database 112. In other embodiments, geofence 256 may be associated with other regularly visited locations of user 252, such as a grocery store that user 252 visits once every few days, a church that user 252 visits every week, or a daycare center that user 252 visits everyday.

Geofence 258 may be a geofence associated with a regular route (e.g., commute) of user 252. Thus, geofence 258 may be of an area around the regular route. In certain embodiments, geofence 258 may be, for example, an area or a smaller radius or distance around the route compared to the distance of geofence 256 around the work location as a deviation from the route may be determined to be of greater inconvenience to user 252 than visiting a location around user 252's place of work (e.g., due to the duration of user 252's lunch break). In other embodiments, the size of the various geofences may be varied based on such or other considerations (e.g., convenience to users, free time of users, and/or other such considerations).

Geofence 260 may be a geofence associated with a home location or other location associated with user 252. In certain embodiments, the various geofences may be different sizes or geometries depending on various known factors of user 252 (e.g., free time, convenience due to daily schedules, the possible types of transportation utilized by user 252, and/or other factors). Accordingly, geofence 260, being located around the home location of user 252, may be larger in size compared to geofence 256, as user 252 detouring to provide relationship based fulfillment on the way home may be more convenient than providing relationship based fulfillment when at work.

Geofences 254 to 260 may be varied by, for example, traffic conditions around user 252 or may be varied based on the detected mode of transportion of user 252. Accordingly, for example, the user device of user 252 may include one or more accelerometers, gyroscopes, GPS components, microphones, and/or other components. Data from such components allow for traffic conditions (e.g., based on traffic data received from other sources) and/or mode of transportation to be determined. For example, if the user device detects regular step like movement from its accelerometers, that may indicate that user 252 is walking. However, if location data from the user device indicates that the user is traveling at 60 miles per hour and is following roads, that may indicate that the user is driving. Based on the detected mode of transportation, the size and/or shape of geofences 254 to 260 may be varied. Thus, a walking user may result in smaller geofences while a driving user may result in larger geofences in order to accommodate the larger area of possible movement of a driving user. A user detected to be employing mass transportation may have the size and shape of the geofences accordingly adjusted to conform to known mass transportation stations and/or hubs. Thus, based on the detected mode of transportation, the areas that user 252 may provide pick-up from or delivery to for relationship based fulfillment may be accordingly adjusted.

Figure 3:
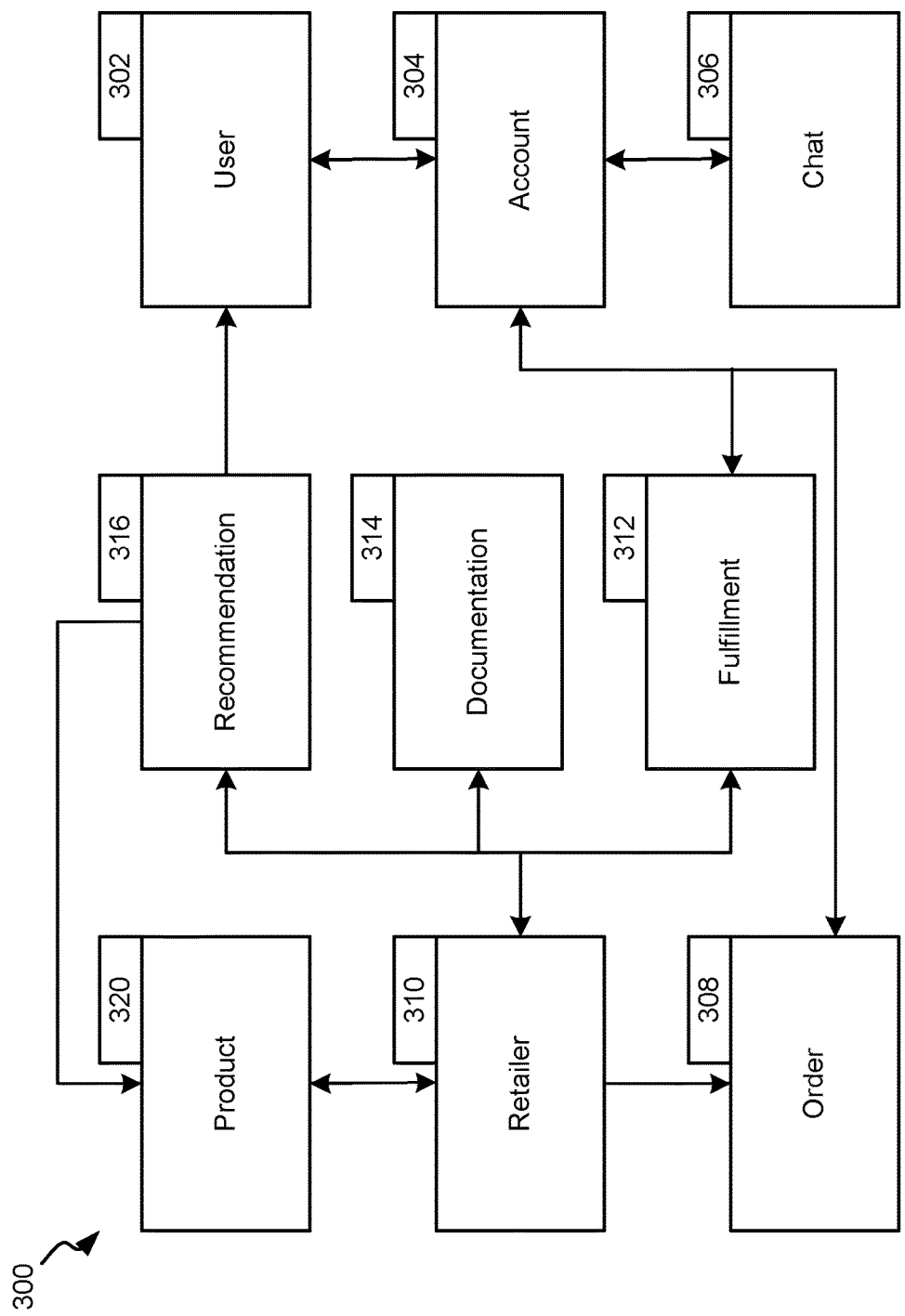
FIG. 3 illustrates a block diagram of another example system for relationship based fulfillment, in accordance with some embodiments.

FIG. 3 illustrates a block diagram of another example system for relationship based fulfillment, in accordance with some embodiments. FIG. 3 illustrates system 300 that includes user device 302, user account 304, chat 306, order 308, retailer 310, product 320, fulfillment 312, documentation 314, and recommendation 316. The various components of system 300 may communicate with each other through data networks, as described herein.

User device 302 may be as described herein, and may allow a user to access user account 304. User account 304 may be associated with the user and may allow user to log-in to an account associated with an application and/or platform. The account may allow the user to request relationship based fulfillment and/or provide relationship based fulfillment, as described herein.

In certain embodiments, user account 304 may allow users to provide compensation for relationship based fulfillment. Such compensation may be pre-determined (e.g., determined by an algorithm of the application and/or platform) or may be negotiated between the user. Pre-determination of such compensation may include factors such as, for example, distance traveled, items purchased, time of day, and/or other factors. In certain embodiments, users may include accounts with the platform and the accounts may be utilized to provide for compensation between users for relationship based fulfillment. In certain situations, a percentage of compensation between users may be deducted by the platform. Such cost compensation may include compensation in various currencies (e.g., U.S. dollar, Euros, and/or other currencies) as well as other forms of compensation such as rebates, cryptocurrency, gift certificates, and/or other such forms of compensation.

Chat 306 may be an application that allows a user to communicate with other users of the application and/or platform. In certain embodiments, users may communicate amongst each other to determine the details of fulfillment once a user has accepted a request for fulfillment. Such details may include, for example, time of delivery, confirmation of delivery address, coordination of delivery (e.g., whether an item has been dropped off), and/or other such aspects.

Account 304 may be utilized to create, modify, provide fulfillment for, and/or otherwise control order 308. Order 308 may be an order of the user from retailer 310. Retailer 310 may be, for example, a brick and mortar shop or other retailer that offers items for sale. Retailer 310 may carry product 320, which the user may have purchased in order 308.

Order 308 may be fulfilled through relationship based fulfillment. As such, fulfillment 312 may be performed. In various embodiments, retailer 310 and account 304 may share data to allow for coordination of fulfillment. Thus, for example, account 304 may provide the user's identifying data, order information, and payment information to retailer 310. Account 304 may additionally coordinate for relationship based fulfillment with a relationship based fulfillment user. Account 304, or the relationship based fulfillment user, may provide details as to fulfillment to retailer 310, allowing for retailer 310 to be informed as to the details of and/or coordinate pick up and/or details of fulfillment 312 with the relationship based fulfillment user.

For order 308 and/or fulfillment 312, retailer 310 may prepare documentation 314. Documentation 314 may indicate the purchaser, order items, order status, identity of the fulfillment user, purchase amount, and/or other information associated with the order. In certain embodiments, the status of order 308 and/or fulfillment 312 may be updated (e.g., when a relationship based fulfillment user has picked up order 308). Such updates may result in the updating of databases, which may be performed via log events to allow for the entire history of order 308 and/or fulfillment 312 to be viewed.

NoSQL, Relation/SQL, and/or other types of databases may be utilized to track user 302 and/or retailer 310 data. Data for retailer 310 may include retailer products, stores, and order documentation. Data for user 302 may include log-in credentials, carts, related orders, and wallet information.

In certain embodiments, based on the account 304 and/or associated social contacts, recommendation 316 may be provided to the user. That is, account 304 is associated with various social contacts and/or social groups. Such social contacts and/or social groups may include shared interests. Accordingly, based on such shared interests, potential items for purchase may be recommended to the purchasing user of account 304 and/or the fulfillment user. As such, though the fulfillment user may originally not have planned to patronize retailer 310 without performing relationship based fulfillment, the performance of such fulfillment may provide an opportunity to provide recommendation 316 to the fulfillment.

In various embodiments, a transaction of user 302 may utilize a plurality of other components of system 300 (e.g., documentation 314 or fulfillment 312) as each transaction may include a plurality of separate events. In such embodiments, each event may be noted as a separate instance and stored within the respective databases. The transaction associated with the event may be identified accordingly. Such a configuration allows for the events of the transaction to be stored within their respective databases even if the components are incompatible (e.g., if separate components provide data in incompatible data formats).

Figure 4:
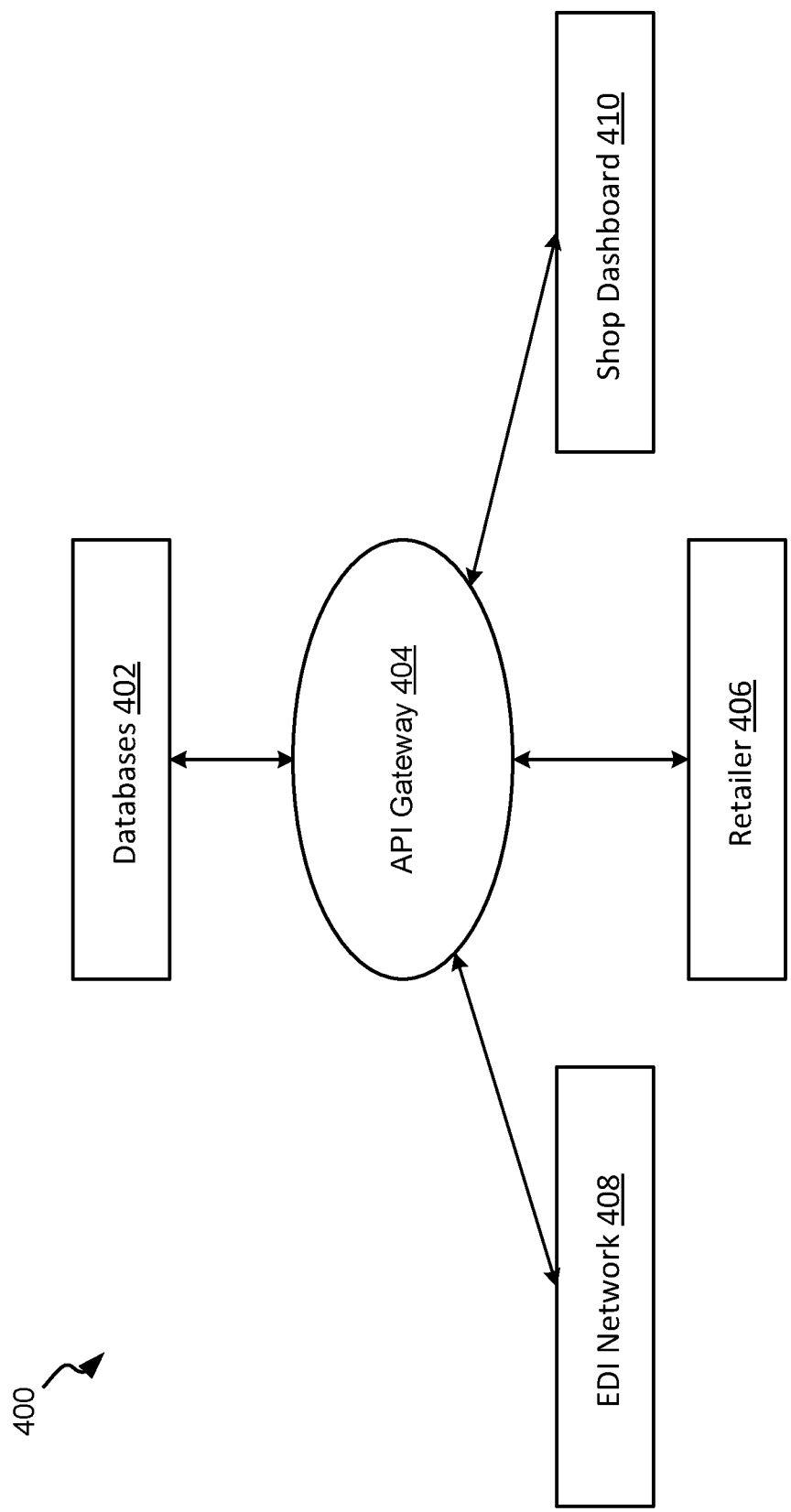
FIG. 4 illustrates a system diagram of a relationship based fulfillment system, in accordance with some embodiments.

FIG. 4 illustrates a system diagram of a relationship based fulfillment system, in accordance with some embodiments. System 400 of FIG. 4 illustrates data flow of EDI network 408, retailer 406, and shop dashboard 410 to API gateway 404. Data received by API gateway 404 may then be provided for sorting and storage within databases 402. Variously, the items described herein may allow a brick and mortar establishment to maintain an online retail experience for users. Furthermore, the relationship based fulfillment may allow such brick and mortar establishments a reliable way of providing quick same day fulfillment without requiring vast resources.

Retailer 406 may be a retailer as described herein. Retailer 406 may utilize one or more applications to coordinate sales, fulfillment, and/or other actions. EDI network 408 may be a network provider configured to allow retailers to utilize existing integrations to transfer data such as inventory, invoices, and/or purchase orders. Shop dashboard 410 may be a dashboard configured to allow a retailer the ability to manually configure their stores. In certain situations, shop dashboard 410 may be an alternative to EDI network 408.

As such, shop dashboard 410 may allow a retailer to create, maintain, modify, and/or delete product listings as well as conduct marketing campaigns and create store pages. Thus, for example, shop dashboard 410 allows for retailer 406 to create and manage several stored locations. Each location may include its own unique products, inventory, accounts, and orders. Each location may also include data related to the employees of the respective location, and the employees may be assigned to manage inventory, fulfill orders, maintain product data, and/or otherwise provide support for sales. Shop dashboard 410 may also allow retailer 406 to create products that may then be added to the listing of products in one or more stores or locations. Such listings may include images, pricing, inventory, and other product data that may be modified as needed.

API gateway 404 may be configured to receive data from one or more of EDI network 408, retailer 406, and/or shop dashboard 410. API gateway 404 may receive such data and provide the appropriate operations. Thus, any one of EDI network 408, retailer 406, and shop dashboard 410 may provide data related to creating, maintaining, modifying, and/or deleting product listings or stores, conducting marketing campaigns, and/or coordinating fulfillment. API gateway 404 may receive such data and provide the appropriate response. In certain embodiments, API gateway 404 may provide various data for storage within databases 402. Databases 402 may be the databases as described herein.

Figure 5:
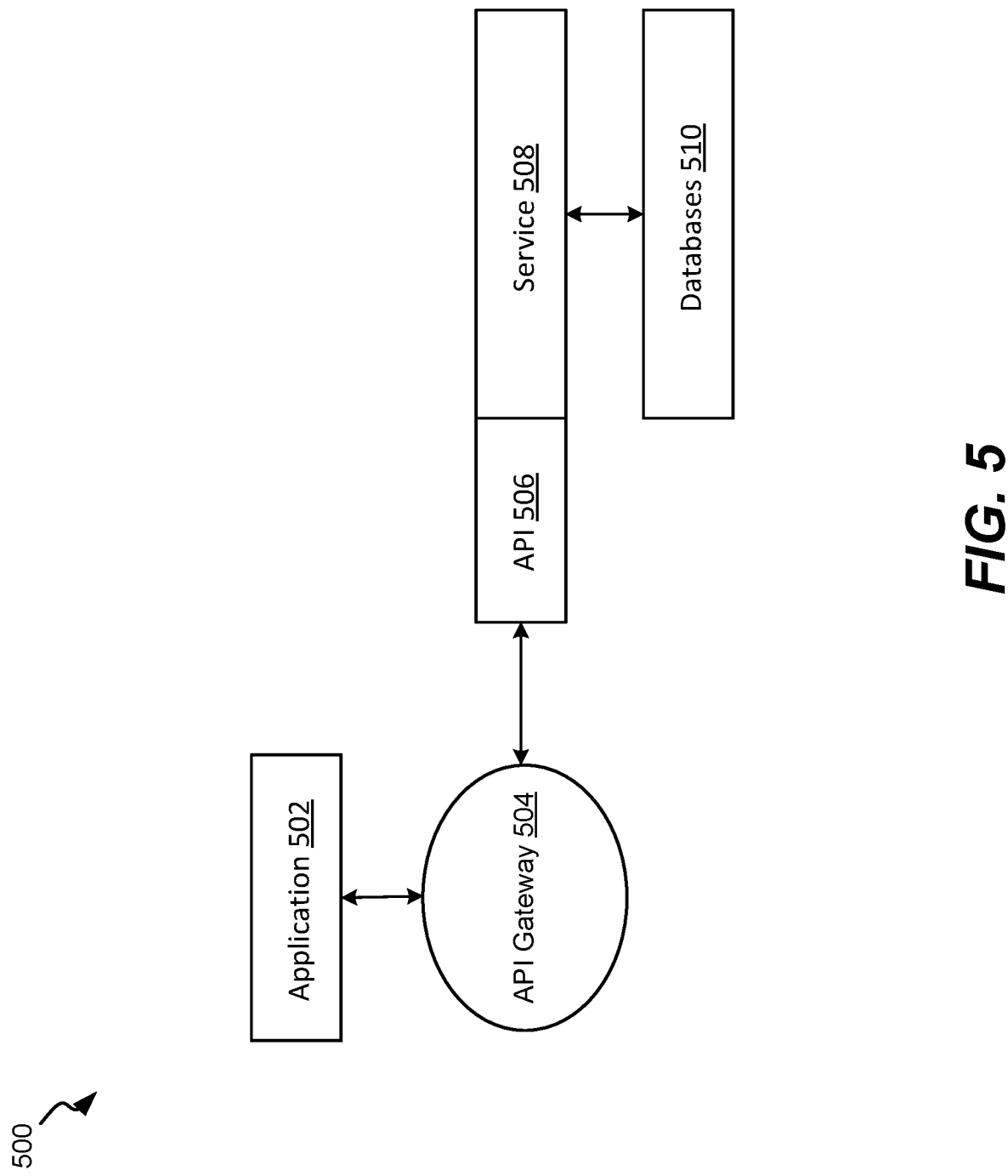
FIG. 5 illustrates another system diagram of a relationship based fulfillment system, in accordance with some embodiments.

FIG. 5 illustrates another system diagram of a relationship based fulfillment system, in accordance with some embodiments. FIG. 5 illustrates system 500, which is configured to implement the techniques and processes described herein. System 500 may include application 502, API gateway 504, API 506, service 508, and databases 510.

Application 502 may be an application on a user device, as described herein. Application 502 may allow a user to access service 508 through a user device. Service 508 may allow for a user to purchase items from a retailer and arrange for relationship based fulfillment. Application 502 may communicate with service 508 via API gateway 504. API gateway 504 may provide access to API 506. For example, API gateway 504 may receive log-in or authentication credentials of the user of application 502. Based such credentials, API gateway 504 may then allow for application 502 to access API 506.

API 506 may be, for example, an API that allows for the user to purchase one or more items from a retailer. API 506 may also allow for the user to arrange for relationship based fulfillment. API 506 may, accordingly, allow for the user to access one or more processes of platform 102 and/or one or more databases of platform 102 (e.g., database 510) to arrange for relationship based fulfillment. API 506 may, thus, based on a request for relationship based fulfillment from the user of application 502, access database 510, and utilize the data from database 510 to identify one or more potential relationship based fulfillment users that may accept the user of application 502's request for relationship based fulfillment.

Figure 6:
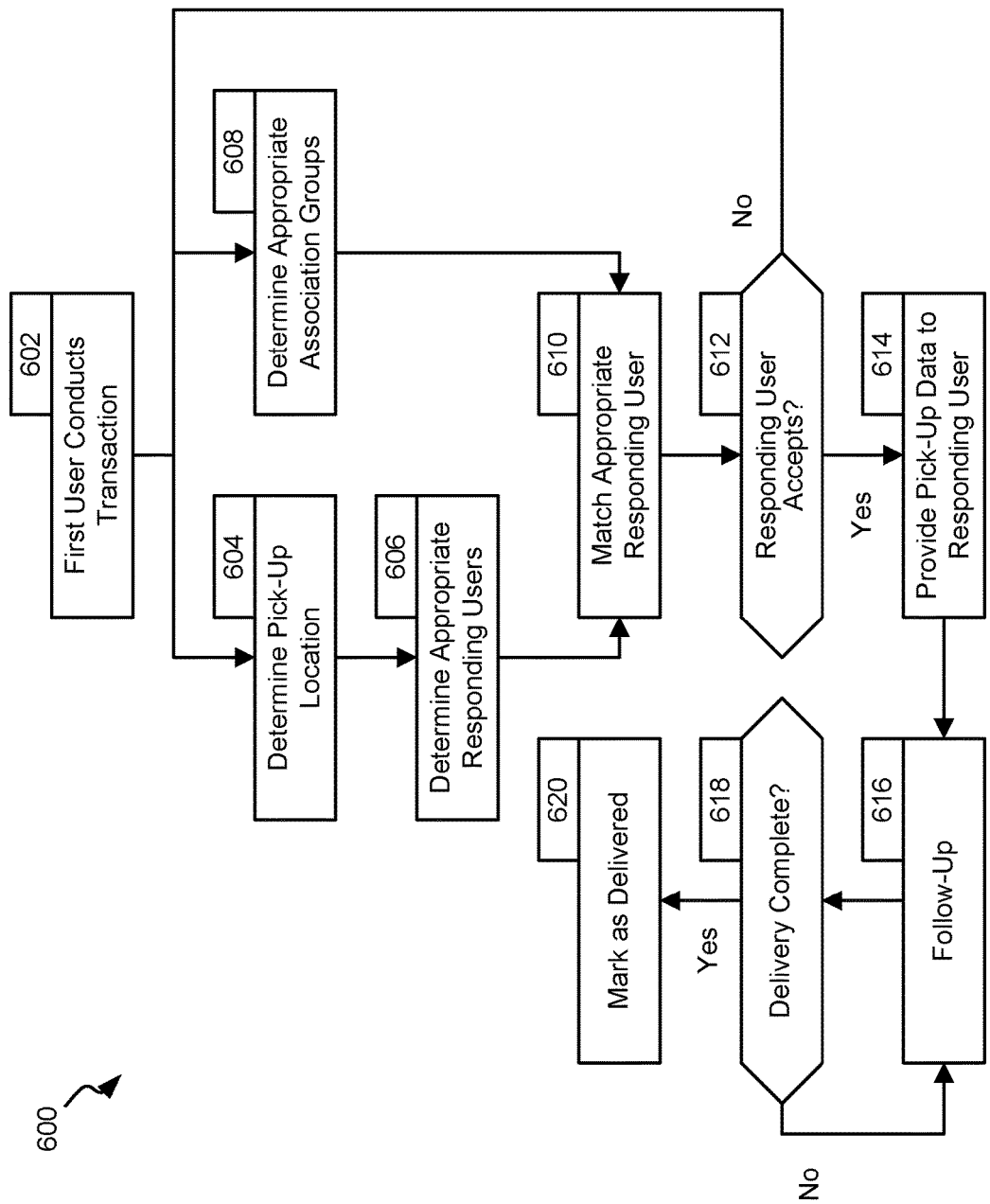
FIG. 6 is a process flowchart corresponding to a relationship based fulfillment technique, in accordance with some embodiments.

FIG. 6 is a process flowchart corresponding to a relationship based fulfillment technique, in accordance with some embodiments. Technique 600 of FIG. 6 is directed to a technique for providing and coordinating relationship based fulfillment.

In 602, a first user conducts a transaction. The transaction may include purchasing of one or more items from one or more brick and mortar shops. The transaction may include a request for relationship based fulfillment of the order. In certain embodiments, the order and request for relationship based fulfillment may be included within the same request, but in other embodiments the order and the request may be different requests and may, in fact, be provided to different entities.

The order and/or the request for relationship based fulfillment may include a pick-up location (e.g., the location of the store providing the item). The pick-up location may be determined in 604 by, for example, determining the location of the store from the order, by having the user specify a pick-up location, and/or through consulting of one or more databases described herein to determine the location of the store. In certain embodiments, the transaction may include orders from a plurality of locations of a retailer and/or from a plurality of different retailers. In such embodiments, the pick-up location may be determined for each of the orders from the plurality of locations and/or retailers.

Based on the pick-up location, potential relationship based fulfillment users may be determined in 606. Such potential relationship based fulfillment users may be users that are within a threshold distance or within a geofence proximate to the pick-up location. Furthermore, relationships of the potential relationship based fulfillment users to the requesting user may be determined. As such, the various potential relationship based fulfillment users may be categorized according to their willingness and/or suitability for providing the requested relationship based fulfillment. In embodiments where the order includes a plurality of locations and/or retailers, one or more potential relationship based fulfillment users may be determined. Accordingly, while pick up from certain nearby locations may be accomplished with the same relationship based fulfillment user (as the destination address is all the same), other situations may utilize a plurality of different relationship based fulfillment users. Pick-up for each location may be determined according to the techniques described herein (e.g., in FIG. 2A). Such determinations may be separate for each location or, when locations are within a threshold distance (e.g., within the same shopping plaza), may be a shared determination for a plurality of such locations.

Furthermore, in 608, appropriate association groups associated with the requesting user may be determined. Such association groups may be determined from, for example, social groups that the resulting user is a part of, various social contacts and the interests and/or social groups that the social contacts are a part of, listed and/or stored interests of the requesting user. In certain embodiments, based on the contacts and/or interests of the requesting user, the appropriate association groups (e.g., groups that the requesting user has interests in) may be determined. The user may additionally specify one or more groups and/or interests (e.g., within application 136). Appropriate association groups may also be determined for the user (e.g., based on machine learning from location data of the user) based on data determined from actions of the user (e.g., from data of user device 130). As such, machine learning may be utilized to determine appropriate association groups. As data may be periodically or continuously received from user devices (e.g., location data as well as data from applications of the user device), machine learning may be utilized to refine and/or update association groups that are determined for the user.

For example, a user may indicate that the user is a member of a church. The church may then be added as an association group related to the user (e.g., within group database 114). Furthermore, location data provided by the user device may indicate that the user is at a specific location every evening on Monday, Wednesday, and Friday. Based on data from location database 116, that location may be determined to be a community college. As such, the community college may then be added as an associated group related to the user. Additionally or alternatively, the user may be determined to be an amusement park annual pass holder (e.g., from location data or data of an application associated with the amusement park provided by the user device). As such, the amusement park may be added as an associated group related to the user. In certain embodiments, user data and/or association data of the user (e.g., stored within user database 112 and/or association database 118) may indicate that the user is at the location of the church and community college, or otherwise performing tasks associated with the church or community college, at certain specific and regular times of the week. Such times may be utilized in the determination in 610.

Based on the association groups, various users may be associated with various locations even if they are not currently nearby such locations. Thus, for example, a user may be a part of or may be indicated to be linked with an association group related to a church or community college. Associations groups expand the pool of potential relationship based fulfillment users. Furthermore, the association groups may allow for social connections between various users with a geographic connection and, thus, allows for establishment of meaningful social relationships. Such social relationship may then increase the social relationship between the users (and such increases may be reflected within data stored in association database 118) and may, thus, increase the suitability score for relationship based fulfillment between the various users.

As such, in certain embodiments, when a requesting user requests relationship based fulfillment from the pick-up location, users in groups that are associated or nearby the pick-up location may also be searched, in addition to users that are currently at the location. As such, if the pick-up location includes a nearby community college, association groups related to the community college may also be searched for potential relationship based fulfillment users. Such a technique allows for determination of a larger potential pool of relationship based fulfillment users than that of simply users who are nearby. In such an example, even though a user may not be currently nearby the requested pick-up location, membership or being associated with the association group may indicate that the user may, in the future, be nearby the requested pick-up location. In certain embodiments, association with the group may be combined with, for example, a predicted schedule of the user. As such, the class schedule of a user of the community college may be predicted and, thus, a determination made that the user has class on Monday, Wednesday, and Friday. As such, such a user may be determined to be available for relationship based fulfillment from the pick-up location if the request is on a Monday, Wednesday, or Friday.

Based on determinations of 604-608, one or more potential relationship based fulfillment users may be determined in 610, according to techniques described herein. In certain embodiments, an appropriate relationship based fulfillment user may be selected from the one or more potential relationship based fulfillment users, according to the techniques described herein. A request to provide relationship based fulfillment may then be provided to the selected potential relationship based fulfillment user. Such a request may be in the form of a SMS message, an online message, an online request, and/or another such request. The request may allow the potential relationship based fulfillment user to accept or decline (e.g., through one or more buttons) and may, in certain embodiments, include information related to potential compensation for performing the relationship based fulfillment.

Data associated with the locations of potential relationship based fulfillment users may be utilized for 610. In certain embodiments, the user devices may constantly or regularly provide location data to the platform and such data may then be utilized in 610. In other embodiments, the platform may request location data from the user devices of the appropriate potential relationship based fulfillment users (e.g., from an analysis identifying appropriate potential contacts of the user) upon determining an initial match of appropriate users. The appropriate user devices may then provide such data for determining the potential relationship based fulfillment users.

In various embodiments, matching may be performed by the user device and/or the platform. In certain such embodiments, data from the retailer and/or the user device may be provided to the platform (e.g., the location data of users associated with the platform as well as order data from the user device of the requesting user and/or from the retailer). The platform may then perform the appropriate matching.

In certain embodiments, one or more potential relationship based fulfillment users for performing the requested fulfillment may be identified. Once matching has been performed, data may be provided to the requesting user's device to identify the one or more such users. The user may then select the preferred relationship based fulfillment user.

In another embodiment, once one or more potential relationship based fulfillment users for performing the requested fulfillment is identified, a most appropriate relationship based fulfillment user is identified (e.g., the relationship based fulfillment user that has the highest calculated suitability score). The platform may then communicate a message to the user device of that relationship based fulfillment user to request a response as to whether that user is able to perform the fulfillment. Such a request may expire within a set timeframe.

Utilizing the platform to perform such calculations and communications allows for more accurate calculation and centralization of data. For the platform to perform such techniques, the contacts of the users (e.g., phone contacts and/or social media contacts) may be provided to the platform. The platform may then securely store the contacts within the databases, such as the databases described in FIG. 1. Platform 102 providing for such determinations allows for more centralized, more memory efficient, and faster performance of the techniques described herein.

In another embodiment, the user device of the requesting user may obtain data from the platform. In certain such embodiments, data related to other users may be changed by the platform so that identifying data is not provided. The user device may then receive such data and determine the appropriate match and provide a requested match to the platform. The platform may then determine the identity of the requested match and contact the requested matched user and/or provide data for the user device to contact the requested matched user to perform such fulfillment. Such a technique provides for enhanced data privacy.

In further embodiments, the user device may request relationship based fulfillment and such a request may be provided to the electronic device of the retailer. The retailer may then determine the appropriate match and contact the users accordingly.

The potential relationship based fulfillment user may accordingly accept or reject the request in 612 (e.g., by toggling an accept or reject button within the request).

If the potential relationship based fulfillment user rejects the request, the technique may return to 604 and 608 and a new matching potential user selected. If the potential relationship based fulfillment user accepts, the technique may proceed to 614.

In 614, after the potential relationship based fulfillment user has accepted the request, pick-up data may be provided to the relationship based fulfillment user that has accepted. The pick-up data may include data related to the pick-up address (e.g., address of the brick and mortar shop), how to pick up the item, the identity and/or quantity of the item. Pick-up data may be provided by the retailer and may include data related to the time at which an order is ready to be picked up. After an order has been picked up, an update is provided to the platform and, in certain examples, to the requesting user. Status of the order may then be updated accordingly.

In certain embodiments, the pick-up data may allow the relationship based fulfillment user to communicate with the requesting user. As such, a link or other information may be communicated to the accepting relationship based fulfillment user to allow communications between the requesting user and the accepting relationship based fulfillment user. The communications between the requesting user and the accepting relationship based fulfillment user may allow the two users to coordinate pick-up and/or delivery of the items. Pick-up and/or delivery of the items may then be performed.

In certain embodiments, follow-up of the delivery may be performed in 616. Follow-up may include, for example, determining if an update for the delivery (e.g., confirming the delivery) has been provided to the platform. Such an update may be data transmitted from an electronic device of the relationship based fulfillment user indicating that the data has been performed. Additionally or alternatively, the requesting user may provide data indicating that the delivery has been performed and that the item has been received.

In certain embodiments, data may be provided confirming the delivery in the form of, for example, pictures of the item(s) picked up and/or dropped off at the agreed upon location, GPS data of an electronic device of the relationship based fulfillment user being within the area of the pick-up and/or delivery address (e.g., within a geofence around the pick-up and/or delivery address), the retailer confirming pick-up of the item (e.g., manually or automatically), and/or other indications of successful pick-up and/or delivery. In certain such embodiments, an estimated time of completion may be provided (e.g., from one of the users) and/or determined and if the fulfillment has not been performed within a threshold period of time, 616 may be performed.

In various embodiments, follow-up in 616 may include providing a message to the requesting user and/or the user performing the fulfillment to request confirmation of whether fulfillment has been performed. Additionally or alternatively, the retailer may be contacted to determine if the item has been picked up. It is appreciated that, as described herein, any contact with the retailer may be manual contact or may be contact via one or more applications of the retailer.

A response may be received in 618. The response may indicate whether fulfillment has been performed. If fulfillment has been performed, the technique may proceed to 620 and the item may be marked as delivered. The transaction may then be considered closed. In certain embodiments, compensation may then be paid to the fulfilling user. If delivery is not determined to be performed, additional follow-ups may be scheduled and performed and, thus, the technique may return back to 616.

Figure 7:
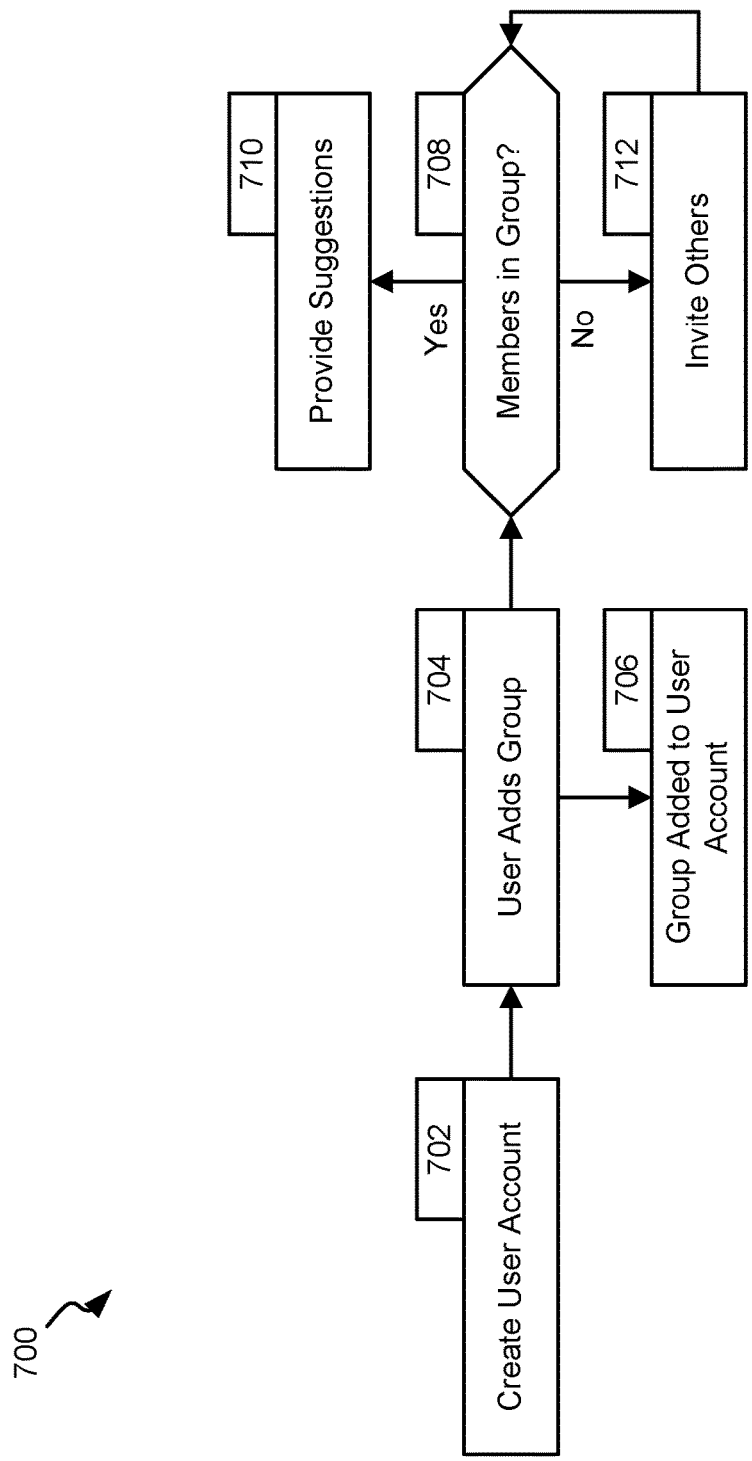
FIG. 7 is a process flowchart corresponding to a relationship based group determination technique, in accordance with some embodiments.

FIG. 7 is a process flowchart corresponding to a relationship based group determination technique, in accordance with some embodiments. In certain embodiments, users of platform 102 may include a profile and a contact list unique to platform 102. The user may add other users to their contact list within platform 102, which may then be available for performing relationship based fulfillment. When a user creates or updates their profile or account, or when the user visits a location, the user may have the opportunity to find groups or contacts that have similar everyday lives or similar interests. The user may thus be able to include additional contacts that may have similar schedules, locations, interests, and/or other aspects of their lives. Such contacts may be appropriate contacts to share relationship based fulfillment.

In 702, a user creates an account. The user may create a profile, log-in information, specify commonly visited locations (e.g., the user's place of residence and place of work), interests, and/or provide information as to other aspects of the user's life. Once the user's account is created, the user may browse and add interest groups of the platform, in 704. Such interest groups may be stored in, for example, group database 114. If the user finds a group of interest, the user may join the group and/or the group may be added to the user's account as an associated group in 706.

Upon the user joining and/or adding the group, the platform may determine if there are members within the group that are appropriate for suggesting to the user, in 708. Such users may, for example, in addition to also being members of the group, share another characteristic with the user. Thus, for example, location or user data may indicate that such other users may live near the user creating the account, work near the user creating the account, share other interests or hobbies with the user creating the account, are contacts in other mediums (e.g., phone contact, other social media contacts), and/or otherwise may be appropriate for connecting.

If such users are determined, they may be suggested to the user in 710 as a contact to add for the user account. Additionally or alternatively, the user creating the account may be invited to add other potential members to the group in 712. In certain embodiments, appropriate members may be suggested to the user creating the account. Such users may include contacts of the users and/or users of other platforms where they share a common interest (e.g., are a part of common interest groups on that platform).

Figure 8:
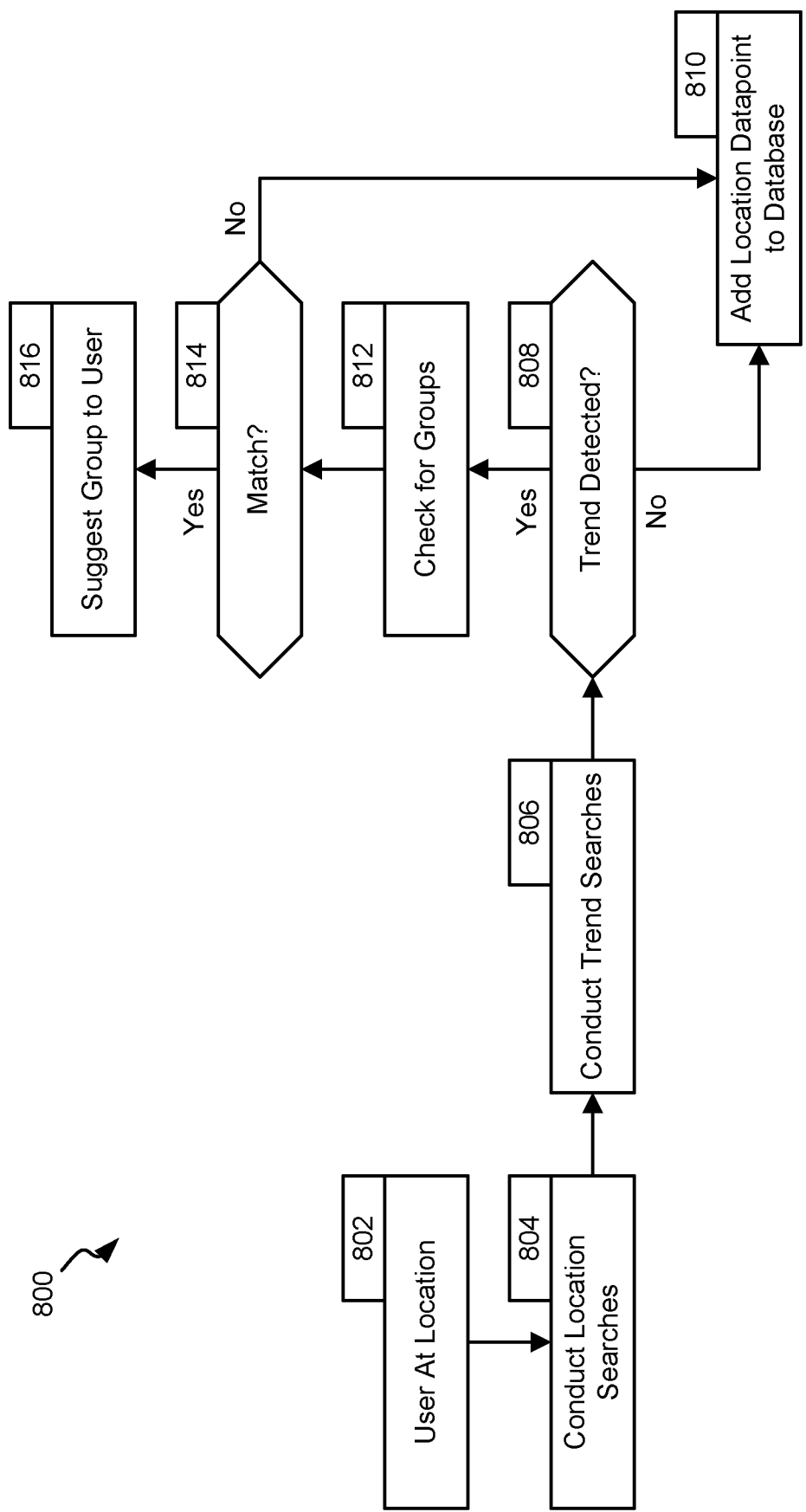
FIG. 8 is a process flowchart corresponding to another relationship based group determination technique, in accordance with some embodiments.

FIG. 8 is a process flowchart corresponding to another relationship based group determination technique, in accordance with some embodiments. Technique 800 may allow for groups to be suggested to a user, allowing a user to expand their social contacts. The pool of users that may then be available to perform relationship based fulfillment for the user may accordingly be expanded.

In 802, a user visits a location. The electronic device of the user may provide location data to a server device (e.g., platform 102). The location data indicates the location of the electronic device and thus the location of the user.

Based on the location data provided in 802, in 804, location searches for nearby businesses, groups, social activities, and/or related users may be conducted. For example, based on the location of the user, a nearby business or entity may be identified that may be of interest to the user. Otherwise, the location data may indicate that the user is at a supermarket or a boot camp gym, indicating that the user has an interest in either grocery shopping or in attending boot camp gyms.

In 806, searches for trends within the user's location may be conducted. In certain embodiments, the user's location may be cross-referenced to determine whether any nearby businesses or entities may be trending (e.g., popular with other users). As such, common meeting areas such as a church or gym may be trending within the general area of the user. A trend may be detected in 808. If a trend is detected, the technique may proceed to 812. If there are no trends detected, the technique may proceed to 810.

In 810, a location datapoint may be added to a database of the platform (e.g., location database 116). The location datapoint may form the basis for such a location within the location database. Thus, future trends and/or businesses for the area may be included within the location datapoint, allowing the location datapoint to be the "seed" that grows the data for the area. In other embodiments, the location datapoint may provide additional details about the location (e.g., that a user with a combination of interests similar to the current user may not have a matching trend in the general area). Such additional details may allow more detailed analysis of the location by the platform, so further trends may be identified that may be associated with the area.

In 812, groups associated with the trend identified in 808 may be identified. Thus, for example, social groups that are associated with the trending group (e.g., a church group associated with the church) may be identified. Based on the groups identified in 812, whether the groups identified is a match for the user may be determined in 814.

If there is a match between the user and a group that the user has an interest in (e.g., a group in which the user had previously indicated interest in or one in which the location data indicates that the user is currently engaged in activity with), the user may be invited to join a group associated with the trending entity in 816. If the user joins the group, the user may then receive suggested contacts (e.g., other users) to connect with that are within the group. Otherwise, if there are no matches, the technique may proceed to 810 from 814.

Figure 9:
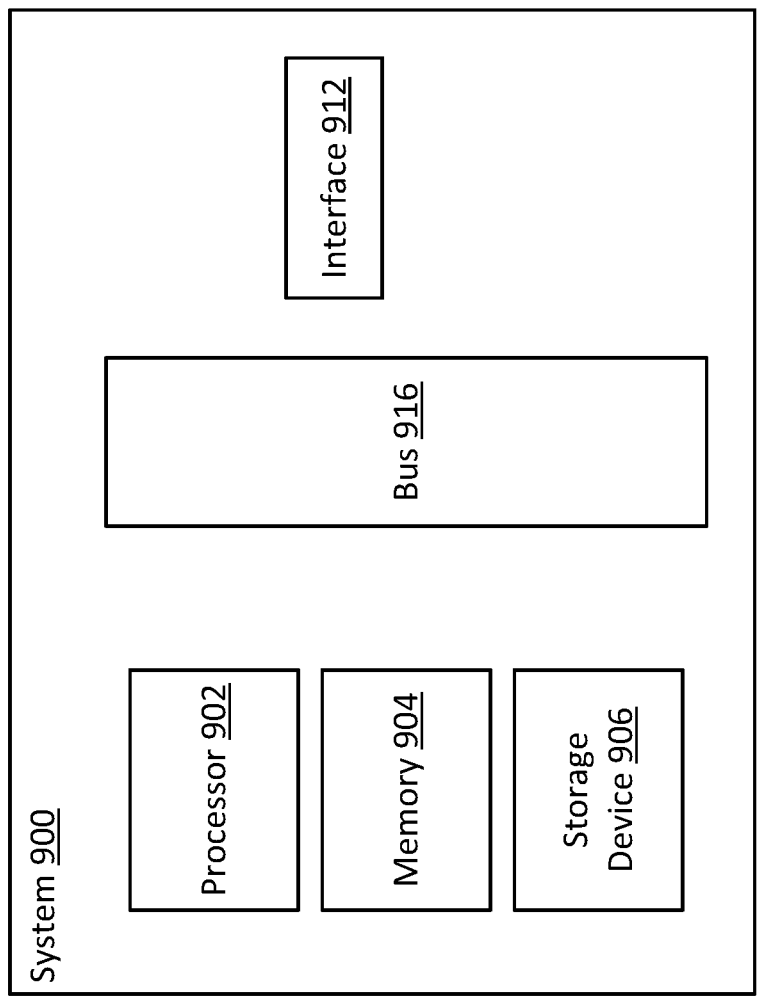
FIG. 9 illustrates a block diagram of an example computing system, in accordance with some embodiments.

FIG. 9 illustrates a block diagram of an example computing system, in accordance with some embodiments. According to various embodiments, a system 900 suitable for implementing embodiments described herein includes a processor 902, a memory module 904, a storage device 906, an interface 912, and a bus 916 (e.g., a PCI bus or other interconnection fabric.) System 900 may operate as variety of devices such as a server system such as an application server and a database server, a client system such as a laptop, desktop, smartphone, tablet, wearable device, set top box, etc., or any other device or service described herein.

Although a particular configuration is described, a variety of alternative configurations are possible. The processor 902 may perform operations such as those described herein. Instructions for performing such operations may be embodied in the memory 904, on one or more non-transitory computer readable media, or on some other storage device. Various specially configured devices can also be used in place of or in addition to the processor 902. The interface 912 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Figure 10:
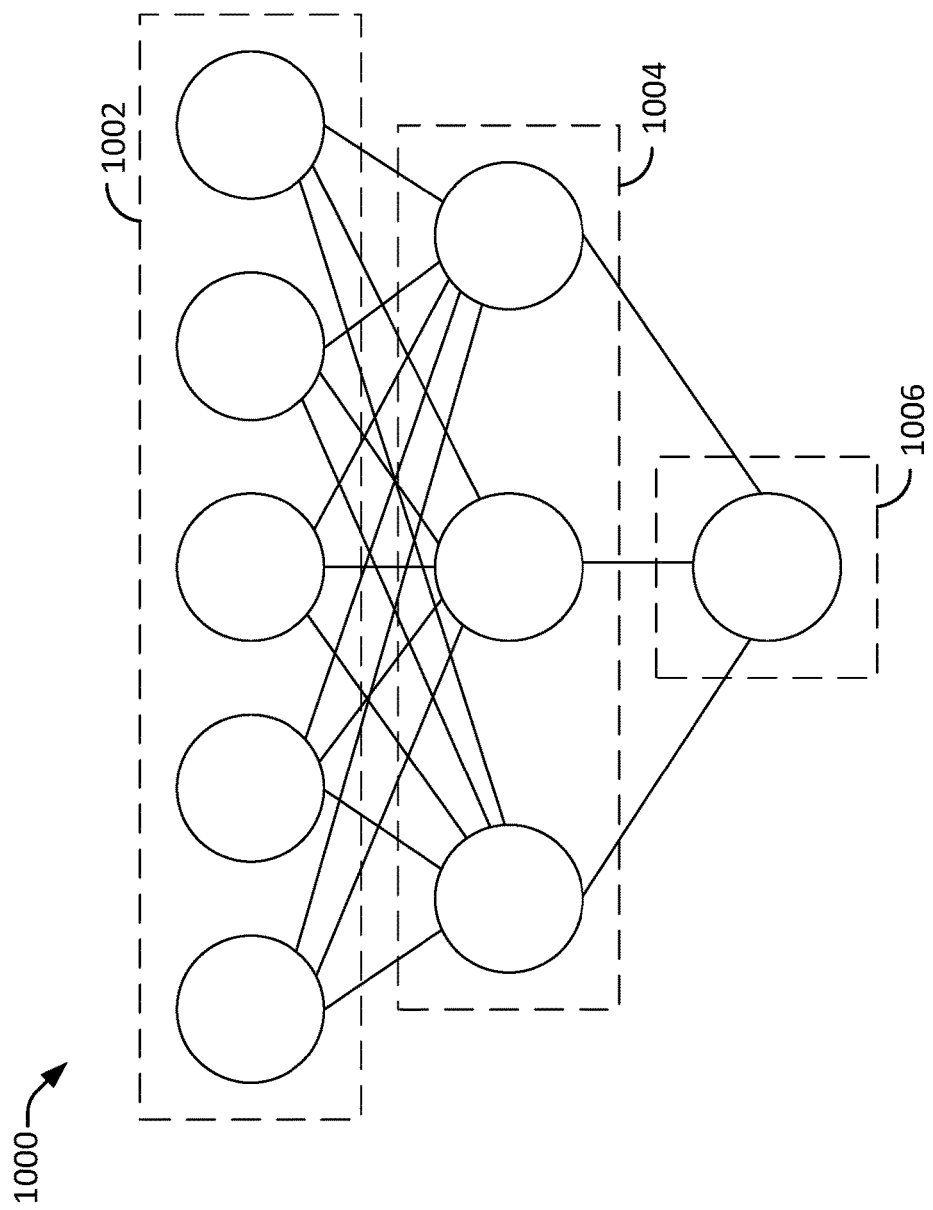
FIG. 10 illustrates an example of a neural network, configured in accordance with some embodiments.

FIG. 10 illustrates an example of a neural network, configured in accordance with some embodiments. FIG. 10 illustrates a neural network 1000 that includes input layer 1002, hidden layers 1004, and output layer 1006. Neural network 1000 may be a machine learning network that may be trained to perform the techniques described herein (e.g., determining a predicted location of a user and/or providing location groups for the user).

Neural network 1000 may be trained with inputs. Input layer 1002 may include such inputs. Such inputs may include, for example, social contacts of the user, location data of the user, groups associated with the user, and/or other such data described herein. Hidden layers 1004 may be one or more intermediate layers where logic is performed to determine various aspects of the data (e.g., determination of appropriate groups for the user). Output layer 1006 may result from computation performed within hidden layers 1004 and may output, for example, recommended groups, predicted locations, likelihood of acceptance of requests for relationship based fulfillment, and/or other such outputs.

Machine learning may be utilized to determine parameters (e.g., association groups, geofences, daily routines, and/or other such parameters) of the techniques described herein and/or to perform the techniques themselves. In various embodiments, machine learning may continuously or periodically refine the determinations based on data received (e.g., additional location data received).

Figure 11:
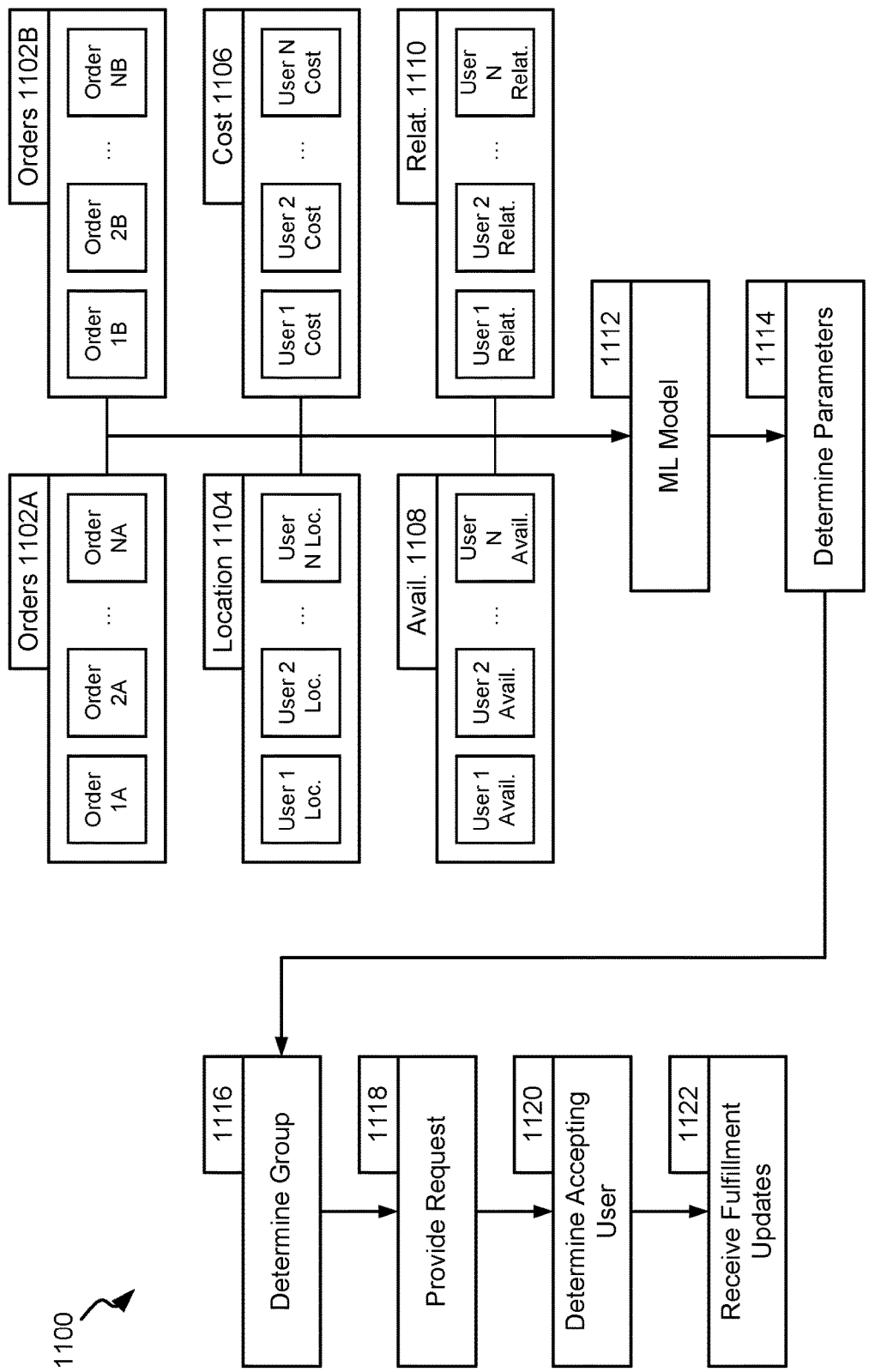
FIG. 11 is a process flowchart corresponding to determining a pick-up fulfillment user member, in accordance with some embodiments.

FIG. 11 is a process flowchart corresponding to determining a pick-up fulfillment user member, in accordance with some embodiments. FIG. 11 illustrates technique 1100 that utilizes a plurality of categories of data (e.g., data stored within the databases described herein) to perform aspects of relationship based fulfillment. In certain embodiments, the data utilized may be limited in one or more aspects. Accordingly, for example, to determine pick-up candidates for relationship based fulfillment in a first area, only data associated with the area may be used.

Such categories of data may include data directed to orders 1102A, orders 1102B, location 1104, cost 1106, availability 1108, and relationships 1110. Each category of data may be associated with one or more specific users (e.g., users whose data is stored within user database 112). Orders 1102A may be data directed to current orders that include requests for providing relationship based fulfillment. Orders 1102A may include data directed to the vendor, the items ordered, the identity of the requesting user, the pick-up and/or delivery addresses, and/or other data.

Orders 1102B may be data directed to various orders and/or transactions conducted by various users. Orders 1102B may include data directed to the vendor, the items ordered, the customer, the pick-up and/or delivery addresses, and/or other aspects of such orders. Orders 1102B may include data directed to some or all orders that are conducted within a platform. The historical data of orders 1102B may influence (e.g., increase or decrease) the likelihood of a user being deemed appropriate to provide relationship based fulfillment for another user.

Orders 1102B may include data directed to previously conducted orders. That is, information related to the items and quantity ordered, the customer, the merchant, and/or the user that provided relationship based fulfillment may be included as such data. Furthermore, the data may be categorized according to order category. Order category may include a category for the items as well as the time sensitivity of the orders (e.g., different types of items ordered may include different time sensitivity for delivery). In certain embodiments, time sensitivity may entail the timeframe that an order was delivered and the satisfaction rating given to the relationship based fulfillment, in order to determine whether such a delivery timeframe was appropriate. Furthermore, the category of orders may be associated with various users, whether the user is the ordering user, the user providing relationship based fulfillment, and/or another such user. Accordingly, whether certain users gravitate towards certain types of orders or prefer providing relationship based fulfillment for certain types of orders may be determined from data of orders 1102B. Such data may be prepared for machine learning model 1112 in a manner appropriate for the determination of relationship based fulfillment candidates.

Location 1104 may include various geofences, as described herein, as well as a current location of the user. The geofences may each be associated with one or more users. Alternatively or additionally, location 1104 may be data associated with specific locations (e.g., addresses, areas, routes, and/or other locations) that are associated with one or more such users. The various locations may influence the likelihood of a specific user being determined to be suitable to provide relationship based fulfillment for another user. Accordingly, for example, if two users are determined to have home addresses that are close to each other, the likelihood of one of the users being deemed appropriate to provide relationship based fulfillment for the other user may become greater. Furthermore, similar work locations, or a requesting user having a location (e.g., work or home) that is along another user's commute may also increase the likelihood of the other user being deemed to be appropriate for relationship based fulfillment.

Variously, the geofences, specific locations, and/or routes may be provided as separate points of data and/or may be included as a single data package that may be associated with a specific user. Thus, in certain embodiments, various location data may be prepared for machine learning model 1112 in a manner appropriate for the determination of relationship based fulfillment.

Cost 1106 may include cost factors associated with one or more such users. For example, in certain embodiments, users may change a cost factor associated with providing service. Cost 1106 may include data related to cost compensation for various users, such as whether a user accepted or rejected a relationship based fulfillment request and the cost compensation offered during the request. Such cost compensation may include compensation in various currencies (e.g., U.S. dollar, Euros, and/or other currencies) as well as other forms of compensation such as rebates, cryptocurrency, gift certificates, and/or other such forms of compensation. In certain embodiments, cost compensation may be determined for each occurrence of relationship based fulfillment while, in other embodiments, cost compensation may be fixed. In certain such embodiments where cost compensation is fixed, the disturbance to the daily routine or travel of a user may be standardized or minimized instead, in order to provide equal incentive for all relationship based fulfillment.

In other embodiments, costs for users for providing service to different other users may vary. For example, if two users are determined to have a personal relationship, the cost for one of the users to provide relationship based fulfillment to the other may be determined to be less and, thus, such relationships may also be included in the data of cost 1106. Additionally or alternatively, certain users may be determined to have a personal interest in certain product lines or categories and the cost factor for such products may accordingly be adjusted downward to reflect such interest.

In certain embodiments, the various data related to the cost factor may be provided as raw data (e.g., what the user's interest is actually at) or may be a set adjustment (e.g., an interest in a first category may adjust the cost factor 30% downward for providing relationship based fulfillment for items of that category). In certain embodiments, machine learning model 1112 may adjust the cost factor, cost data, and other data described herein and, thus, provide for a feedback loop. Accordingly, the various cost factors of cost 1106 may be prepared for machine learning model 1112 in a manner appropriate for the determination of relationship based fulfillment.

Availability 1108 may include data directed to availability of various users. Availability data may, thus, be associated with an individual user. Availability 1108 may include the daily schedules of the users, the routes taken by the users, and/or other such data. Furthermore, availability 1108 may be updated based on the actions of the users. For example, the users may indicate on an application of their user device whether they are available for relationship based fulfillment and data in availability 1108 may accordingly provide such indication.

Relationship 1110 may be data directed to the various relationships of users, as described herein. For example, the contact list, social media contacts, exchanged messages, and/or other data may be used to determine relationships between users, as described herein. Relationship 1110 may additionally include data indicating the nature of the relationship, such as whether the relationship is familial, friendly, work related, acquaintances, and/or another type of relationship. Such relationships may be provided as numerical rating or as a modifier to the relationship data. In other embodiments, the different categories of relationships may be provided as data with different relationship markers.

The data of 1102B to 1110 may be provided to machine learning model 1112. Machine learning model 1112 may utilize data 1102B to 1110 as inputs and may determine parameters 1114 and determine groups 1116 from the inputs.

Determining parameters 1114 may include determining the factors that would be utilized in determining the recommendation groups in 1116. Such groups may be groups of candidate users for providing relationship based fulfillment for one or more orders 1102A. Thus, for example, the parameters of 1114 may include cost parameters (e.g., the importance of cost to determining that a user is an appropriate user for providing relationship based fulfillment), distance parameters (e.g., the important of how close a user is to a requested pick-up and/or to a drop-off location), relationship parameters (e.g., how important it is for a requesting user to have a specific personal relationship to the user providing relationship based fulfillment). As described herein, the parameters determined in 1114 may be global (e.g., applies to all users on a platform) and/or specific to a user. In certain embodiments, the various parameters may be prioritized according to rankings determined by machine learning and/or through inputs from an administration of the platform. Thus, for example, one of a distance of a candidate user to a requested pick-up location or a distance of a candidate user to a requested drop-off location may be considered to be of greater importance or both may be considered equally important.

Based on the parameters determined in 1114, one or more groups may be determined in 1116. Such groups may be potential candidates for providing relationship based fulfillment for one or more orders 1102A. For example, each order within orders 1102A may be orders that request relationship based fulfillment. One or more groups of users within the platform may be provided and/or contacted as potential candidates for providing relationship based fulfillment for each of those orders. In certain embodiments, a plurality of groups may be provided and/or contacted as potential candidates for providing relationship based fulfillment, as described herein.

Thus, after determination of the groups in 1116, requests may be provided in 1118. Such requests may be, for example, provided to one or more members of the groups or one or more groups as determined in 1116. For example, each order may include one or more groups and members within a first group may first receive a request to provide relationship based fulfillment for the order. If no response is received from any member of the first group, members within a second group may then receive a request to provide relationship based fulfillment.

In 1120, one or more users may accept the request to provide relationship based fulfillment. If one user accepts, that user may be selected to provide relationship based fulfillment. If a plurality of users accept, one of the users may be selected to provide relationship based fulfillment, according to the techniques described herein. Data may then be provided to each of the accepting users to indicate whether they were selected to provide the relationship based fulfillment or not and, if they are selected, instructions for pick-up and/or delivery of the order.

After the selected user indicates that relationship based fulfillment is being performed, performance of the relationship based fulfillment may be tracked in 1122. Data may thus be periodically received from the user device of the user providing relationship based fulfillment, or the device of another user (e.g., the user requesting the fulfillment). Such techniques may be similar to the techniques of, for example, 614 to 620 of FIG. 6 as well as other techniques described herein.

Figure 12:
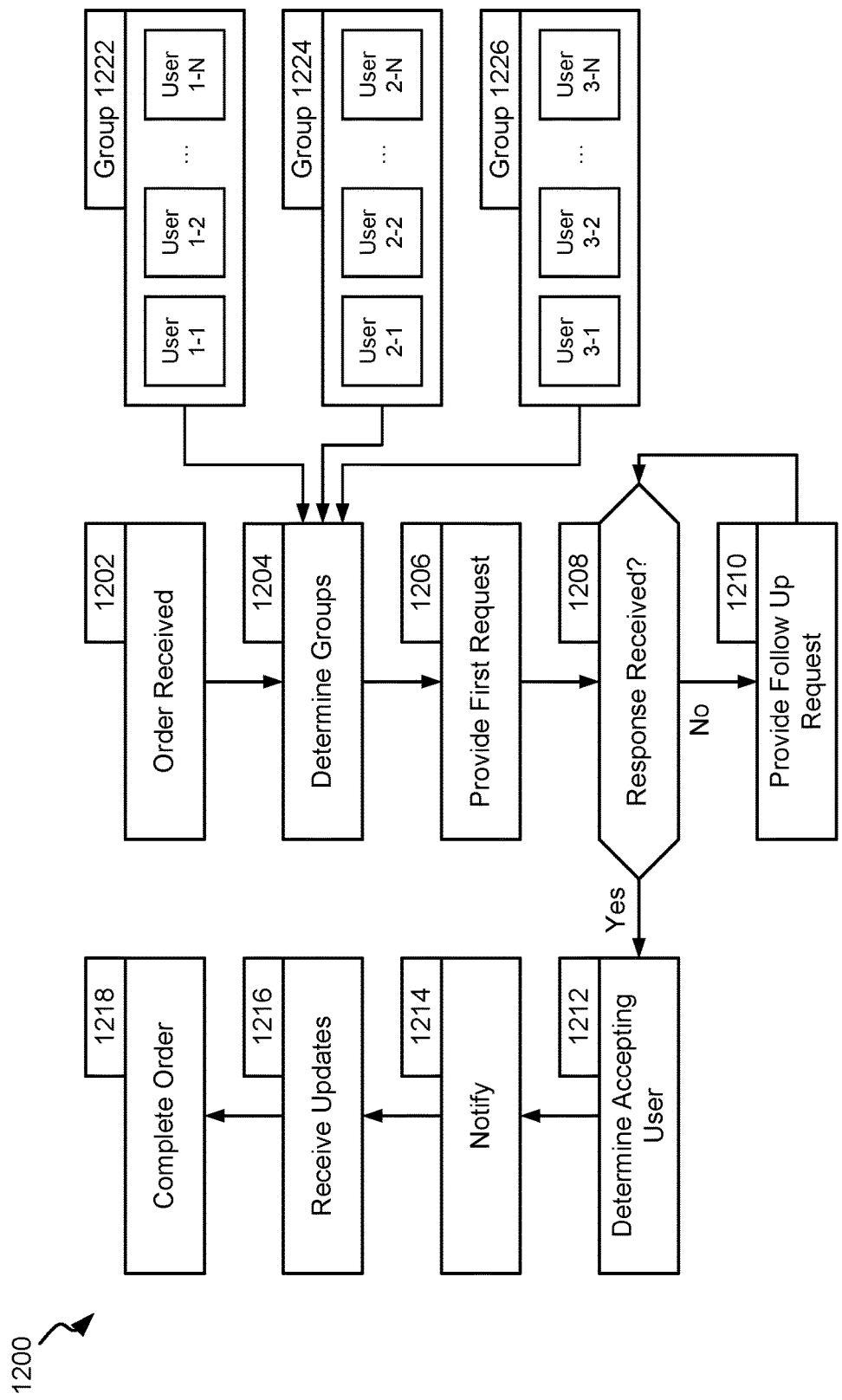
FIG. 12 is a process flowchart corresponding to determining pick-up fulfillment groups and a pick-up fulfillment user member from the pick-up fulfillment groups, in accordance with some embodiments.

FIG. 12 is a process flowchart corresponding to determining pick-up fulfillment groups and a pick-up fulfillment user member from the pick-up fulfillment groups, in accordance with some embodiments. FIG. 12 illustrates technique 1200 that determines an appropriate user for providing relationship based fulfillment.

In 1202, an order may be received by a platform. The order may include a request for relationship based fulfillment, as described herein. In certain embodiments, orders may automatically request relationship based fulfillment. As such, any order through a certain platform may automatically request relationship based fulfillment.

In 1204, candidate groups for providing the relationship base fulfillment are determined. The candidate groups may be determined through machine learning techniques utilizing the inputs and techniques described herein, such as in FIG. 11. A plurality of candidate groups may be determined. Thus, for example, groups 1222, 1224, and 1226 may be accordingly determined in 1204. Each of groups 1222, 1224, and 1226 may include one or more candidate users for providing relationship based fulfillment.

Each of the users within groups 1222, 1224, and 1226 may be determined based on various factors described herein. In certain embodiments, the platform may limit the amount of possible candidates determined by, for example, limiting the pool of potential candidates to one associated within a specific geographical area. Thus, if a pick-up location for relationship based fulfillment is in a first area (e.g., city district, city, or county), a drop-off location is in a second area, and third and fourth areas separate the first and second areas, only users that are associated with one or more of the areas (e.g., users whose user data indicates that they live, work, visit, or travel through one or more of the areas) may be potential candidates for providing relationship based fulfillment. Additionally or alternatively, only users that have a relationship with the requesting user (e.g., as indicated through the user being on a phone contact list, social media contact, and/or through another indication of relationship such as being associated with the same area, as described herein) may be a potential candidate for providing relationship based fulfillment.

In certain embodiments, an estimated cost for providing relationship based fulfillment may be determined for various potential candidate users. The costs may be determined with the machine learning models described herein. Determination of the cost may include determination with the various data (e.g., the order data, location data, historical cost data, availability data, and/or relationship data) described herein. As such, the relationship between the requesting user and the candidate user may influence the price determined by the machine learning model as, for example, a candidate user may be willing to perform relationship based fulfillment for a lower compensation amount for a requesting user that the candidate user has a personal relationship with. Furthermore, the distance that the candidate user is currently located at or will be in the future (e.g., when the candidate user has arrived at work) may additionally affect the cost determination based on, for example, the estimated distance or time that the candidate user would need to travel to pick-up or deliver the order. Historical data indicating the level of compensation needed by the user to agree to provide relationship based fulfillment may also affect the determined cost. The cost may be further affected based on data from other categories.

Additionally or alternatively, the data may be used by the machine learning model to, for example, determine an estimated time for delivery associated with the candidate user, determine a relationship between the candidate user and the requesting user, determine a level of convenience for performing relationship based fulfillment for that request for the candidate user, and/or other such determinations. In certain embodiments, such determinations may be in the form of a numerical rating, graded rating, and/or provided in another manner.

Such determinations may allow for determinations of the compositions of groups 1222, 1224, and/or 1226 as well as other groups. In certain embodiments, groups 1222, 1224, and/or 1226 may be determined according to the factors described herein. The factors may be assigned importance ratings based on that desired by the platform or the administrator of the platform, and/or the factors may be ranked accordingly by the machine learning model to provide optimized group determinations (e.g., to provide for candidate users that are likely to accept providing relationship based fulfillment at minimal cost).

As such, for a machine learning model that mostly or fully optimizes based on cost, group 1222 may be the lowest cost group, while group 1224 may include candidate users that may provide service at a higher cost than the users within group 1222, and group 1226 may be users that may provide service at higher cost than users of group 1224. For a machine learning model that mostly or fully optimizes based on relationship, group 1222 may include users with the closest personal relationship to the requesting user (e.g., family or friends), group 1224 may include users with less close relationships (e.g., co-worker or acquaintance), and group 1226 may include users that have no relationship with the requesting user. Other machine learning models may optimize for other factors and/or a combination of factors.

In certain embodiments, groups 1222, 1224, and 1226 may be candidate groups determined according to the techniques described herein. In certain embodiments, group 1222 may include higher quality (e.g., higher likelihood of acceptable) candidates than group 1224. Group 1224 may also include higher quality candidates than group 1226.

In 1206, a first request is provided. The first request may be, for example, requests to each user member of group 1222 requesting confirmation of whether they're interested in providing relationship based fulfillment for the order of 1202. The requests to each member of group 1222 may be provided as a batch.

In 1208, a determination is made that a threshold condition has been met. The threshold condition may be, for example, that a threshold period of time (e.g., 5 minutes, 10 minutes, 30 minutes, an hour, or another time period) has passed since the requests of 1206 were provided. Upon such a determination, a further determination is made in 1208 as to whether a threshold number of responses have been received. The threshold number of responses may be, for example, one or more responses from candidate users that a request was provided to. If the threshold number of responses is received, the technique may continue to 1212. Otherwise, if a threshold number of responses is not received, the technique may continue to 1210.

If the threshold number of responses is not received, a follow up request may be provided in 1210. The follow up request may be, for example, a request to each user member of another group (e.g., group 1224 or group 1226) requesting confirmation of whether they're interested in providing relationship based fulfillment for the order of 1202. In certain embodiments, the platform may move to contacting users of lower quality groups if a threshold number of responses is not received in 1208 (e.g., members of group 1222 may first be notified in 1206 and, if a threshold number of responses is not received, members of group 1224 may be notified in 1210) in order to increase the potential pool of users that may provide relationship based fulfillment. Such a technique may more efficiently utilize the resources of server devices by, for example, saving initial resources by contacting candidate users in batches instead of all at once. The technique may then return to 1208 to determine if the threshold number of responses has been received. If, in 1208, it is determined that there are no accepting candidate users and no additional candidate users to contact, a credit or monetary compensation may be offered to the requesting user to allow for the requesting user to fulfill the order themselves.

If the threshold number of responses has been met in 1208, the technique may proceed to 1212 and determine the user accepted to provide relationship based fulfillment. The user selected in 1212 may be based on one or more factors. Thus, a certain embodiment may select the lowest cost user that accepted. Another embodiment may select the user with the closest relationship to the requesting user. A further embodiment may select the user that has a location (e.g., current, work, home, and/or commute route) that is closest to the pick-up and/or drop-off location or may detour the least amount of distance from their daily routine to perform the relationship based fulfillment. In certain embodiments, one or more of such factors may be utilized in 1212. In certain embodiments, a machine learning model may be utilized to determine the accepted user in 1212.

Once the accepted user is determined in 1212, the various responding users may be notified in 1214. Accordingly, the accepted user may be notified that the user has been accepted to provide relationship based fulfillment in 1212 via a SMS message, message through an application, phone call, e-mail and/or other technique of contacting and notifying the accepted user. Other users that responded, but were rejected for providing relationship based fulfillment, may also be contacted in 1212 via the techniques described herein, informing them of their rejection. In certain embodiments, users that did not respond may also be informed that the request for relationship based fulfillment has been fulfilled, via the techniques described herein.

In 1216, updates may be received that are directed to the status of the relationship based fulfillment, as described herein. Such updates may include updates as described herein, related to, for example, pick-up, transit, and/or drop-off of the items for relationship based fulfillment. Once the order has been drop-off and confirmation provided that it has been received, the order may be deemed to have been completed in 1218.

Figure 13:
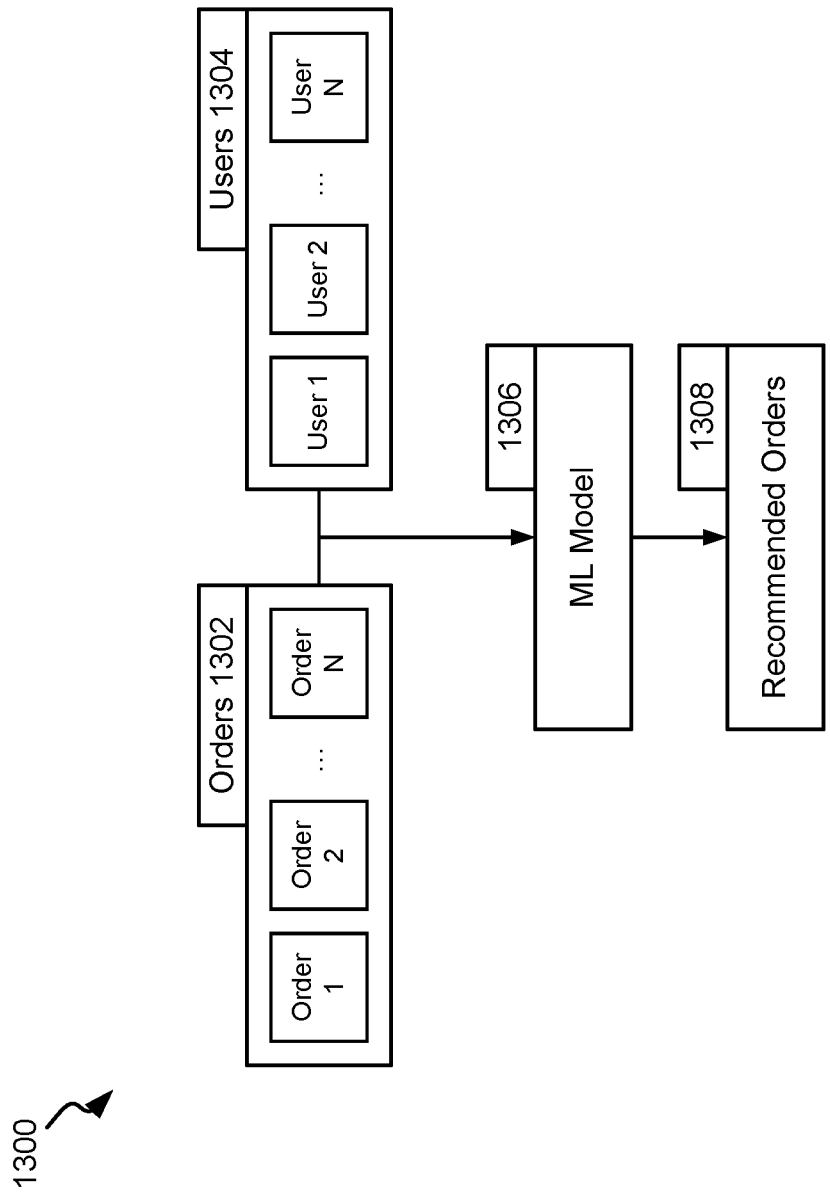
FIG. 13 illustrates a machine learning model for providing relationship based fulfillment recommendations, in accordance with some embodiments.

FIG. 13 illustrates a machine learning model for providing relationship based fulfillment recommendations, in accordance with some embodiments. FIG. 13 illustrates machine learning model 1300 that includes order data 1302 and user data 1304 as inputs. Each of order data 1302 and user data 1304 may include data directed to a plurality of orders and a plurality of users, respectively.

Accordingly, order data 1302 may include data directed to various orders (either conducted on the platform or elsewhere) and may include data directed to the locations associated with the order (e.g., the pick-up location, drop-off location, and/or another such location), data associated with the merchant (e.g., merchant name, branch number, merchant chant, and/or other such data), data associated with the products ordered, the product features, the product categories, and/or other such product data, data associated with the requesting user, the date and time of the order, cost data directed to the cost of the order, the individual items of the order, and/or the cost of the relationship based fulfillment, the weight of the order, the physical size of the order, and/or other such data.

User data 1304 may include data such as the locations (e.g., specific locations or geofences) associated with the various users of the platform, the duration that the various users have been members of the platform, the availability of the users (e.g., whether they have indicated that they are currently available or not for relationship based fulfillment, historical availability data to determine when during a day, week, month, or other timeframe they are typically available for relationship based fulfillment, and/or other availability data), performance ratings of a user, purchasing power of a user, the relationships of the user, the cost history of the user, and/or other such data. Accordingly, for example, user data 1304 may include data related to the interests and purchasing power of the user.

As such, the recommendations provided in 1308 may take into account that a user may have a specific personal interest in the shop and/or the category of the shop or goods sold. Furthermore, it may be determined that the user regularly makes purchases of over $100 when shopping in those categories and, thus, has good purchasing power. As the platform may provide recommendations of items for the user performing relationship based fulfillment, such considerations may make the user more attractive as such a user's interests may represent an additional sale possibility.

Machine learning model 1306 may utilize data 1302 and 1304, as well as other data, as inputs. Machine learning model 1306 may utilize such data as inputs in order to determine the best performing users to request relationship based fulfillment from for any given order. In certain embodiments, the best performing user may be determined based on one or more of cost, delivery time, relationship, sales opportunity, likelihood of acceptance, and/or other considerations, as described herein. In various embodiments, machine learning model 1306 may determine correlations between aspects of data provided and the performance desired in order to optimize the performance of users selected for relationship based fulfillment. Machine learning model 1306 may connect users with various relationship based fulfillment requests. As such, machine learning model 1306 may provide recommendations of various candidate users to provide relationship based fulfillment for specific orders, or may match various candidate users with one or more possible relationship based fulfillment opportunities. Such recommendations may be provided in 1308 by communicating the recommendations to a user device of the candidate user.

Figure 14:
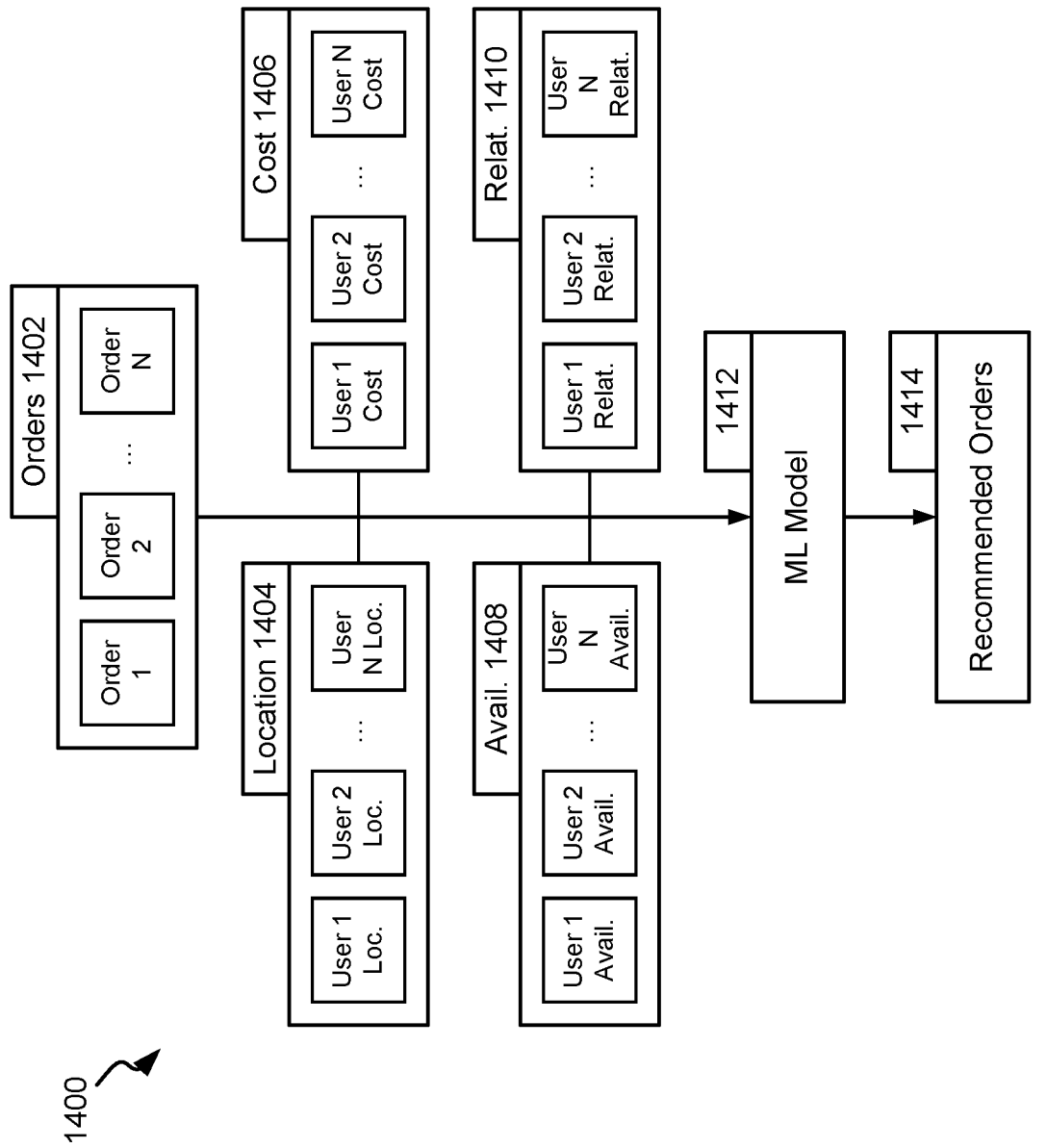
FIG. 14 illustrates another machine learning model for providing relationship fulfillment recommendations, in accordance with some embodiments.

FIG. 14 illustrates another machine learning model for providing relationship fulfillment recommendations, in accordance with some embodiments. FIG. 14 illustrates machine learning model 1400 that includes orders data 1402, location data 1404, cost data 1406, availability data 1408, and relationship data 1410 as inputs. Orders data 1402, location data 1404, cost data 1406, availability data 1408, and relationship data 1410 may include data components as described herein.

Machine learning model 1412 may utilize data 1402 to 1410, as well as other data, as inputs, to determine the best performing users to request relationship based fulfillment from for any given order. Machine learning model 1412 may, as described herein, utilize data 1402 to 1410 to determine the best performing user or users based on the techniques described herein and, thus, various candidate users with one or more possible relationship based fulfillment opportunities. In various embodiments, the candidate users may be assigned a numerical rating based on their suitability for recommendation, according to the considerations described herein. Thus, for example, each user may be rated on a scale of 0 to 1 by machine learning model 1412 or another such scale. In such an example, 1 may be the highest recommendation, though other examples may utilize other rating scales. Based on the rating, candidate users for relationship based fulfillment may be selected. Such recommendations may be provided in 1308 by communicating the recommendations to a user device of the candidate user.

Figure 15:
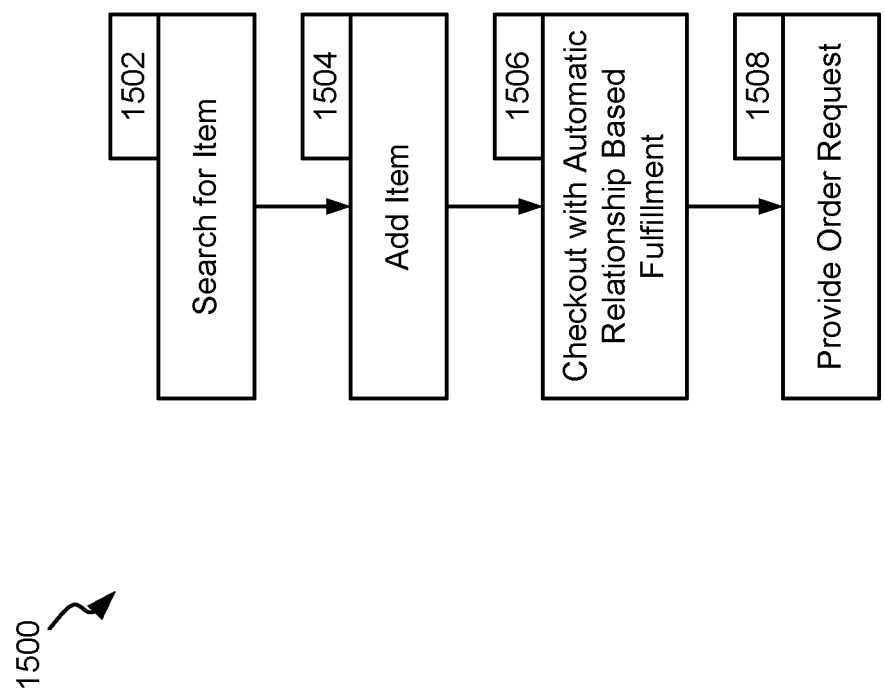
FIG. 15 is a process flowchart corresponding to a user conducting a relationship based fulfillment transaction, in accordance with some embodiments.

FIG. 15 is a process flowchart corresponding to a user conducting a relationship based fulfillment transaction, in accordance with some embodiments. FIG. 15 illustrates technique 1500 for a requesting user to provide a relationship based fulfillment request. Technique 1500 may, fully or partially, be performed on a user device.

In 1502, a user may search for a product for purchase. The search may be performed within an application of the user device. The user may search for one or more terms and/or browse through one or more stores on a platform with the user device. For searches, the user device may then provide data to a server device indicating the search term. The server device may then perform a search (e.g., within its databases) and transmit data that includes the search results to the user device. If the user is browsing through a store, the server device may provide data as to what is available for purchase within the store to the user device.

In certain embodiments, the user device may transmit location data to the server device indicating the location of the user device. The server device may receive the location data and determine the current location of the user device. The search performed by the server device may then be geographically limited to a radius (e.g., 10 mile radius), time of travel (e.g., within 20 minutes of travel), or other consideration around the location of the user device. In other embodiments, the location data may include the work and/or home location of the user device, and/or such locations may be stored within the user database. The search performed by the server device in response to the search request from the user device may be geographically limited to such locations and/or may additionally include such locations within its determined geographical limits.

In 1504, the user may add an item to an electronic shopping cart within the application. The user may then check out the cart in 1506. During check out, relationship based fulfillment is automatically selected. That is, the user does not need to provide a request for relationship based fulfillment. The user may confirm the items to be ordered during check out, provide payment data, shipping address, and/or authentication information, as well as other such data.

Once check out has been confirmed, the order request may be provided to the server device in 1508. The order may then be processed by the platform and one or more relationship based fulfillment candidate users may be identified and contacted. A user for providing relationship based fulfillment may then be determined from accepting candidate users. If there are no accepting candidate users and no additional candidate users to contact, a credit or monetary compensation may be offered to the requesting user to allow for the requesting user to fulfill the order themselves.

Figure 16A:
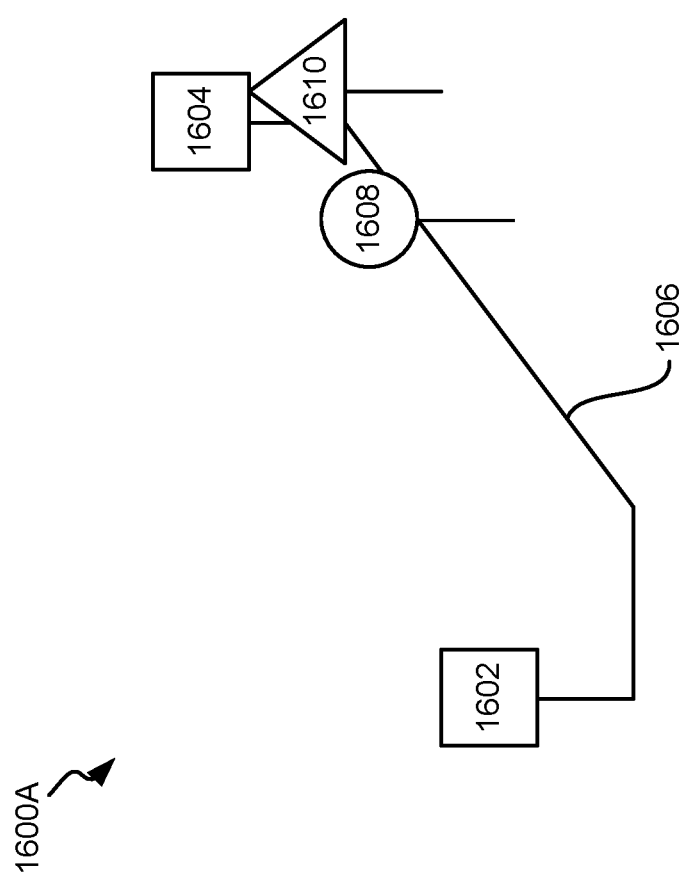
Figure 16B:
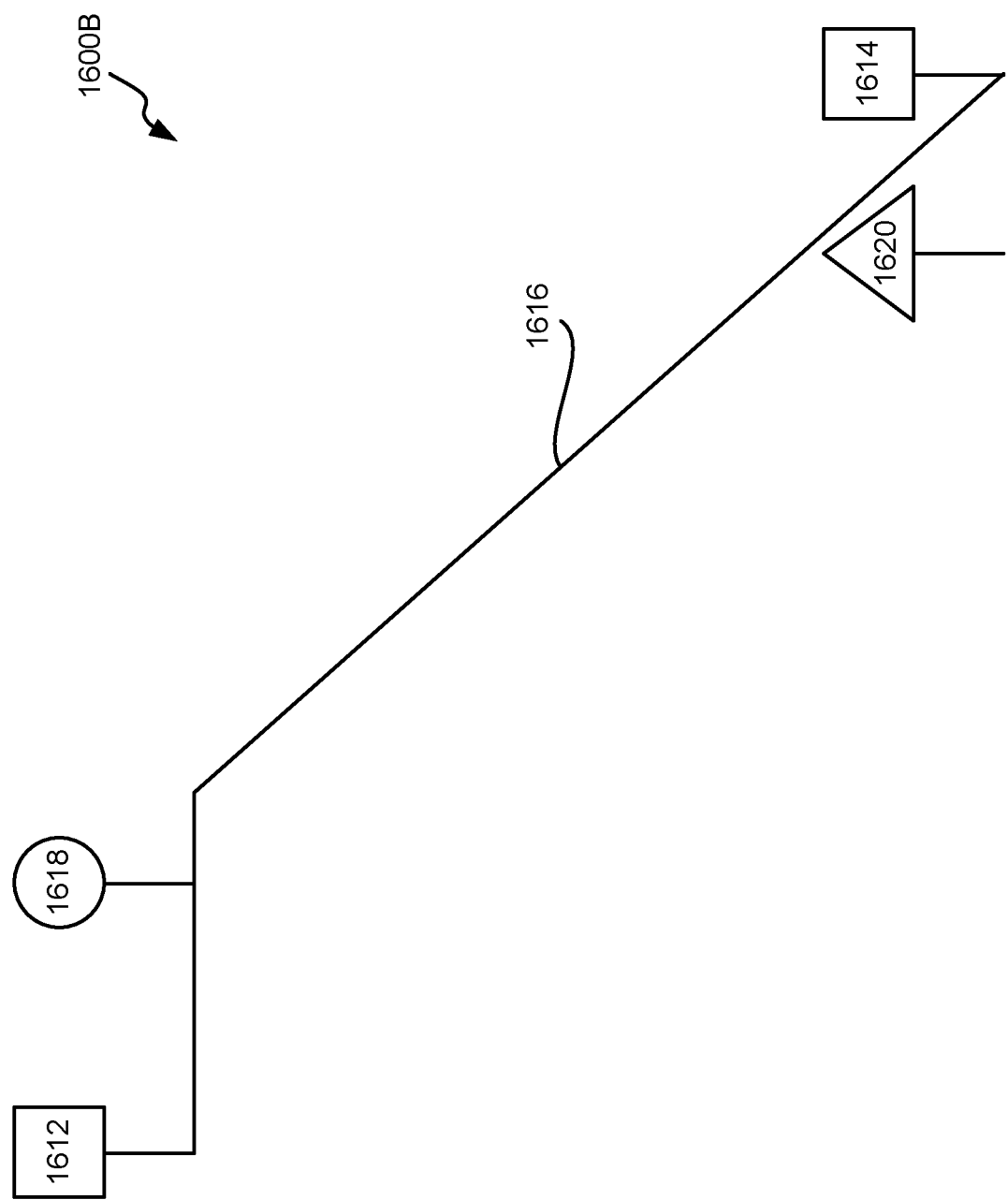

FIGS. 16A-C illustrate examples of relationship based fulfillment recommendations based on disturbances to daily routine, in accordance with some embodiments. In certain embodiments, the techniques described herein within FIGS. 16A-C illustrate examples in situations where cost compensation may be fixed for relationship based fulfillment. Thus, FIGS. 16A-C illustrate embodiments where, despite the differences in distance traveled to provide for the relationship based fulfillment, the disturbance to the daily routine or travel of a user is substantially similar.

FIG. 16A illustrates example 1600A that includes a daily starting/ending location 1602, travel destination 1604, pick-up location 1608, and drop-off location 1610. Daily starting/ending location 1602 may be, for example, a place of residence of a potential relationship base fulfillment provider. Travel destination 1604 may be, for example, a location that the potential relationship based fulfillment provider regularly travels to (e.g., a work location, school location, gym, church, or other location that the potential relationship base fulfillment provider is determined to regularly travel towards). The user (e.g., potential relationship based fulfillment provider) may be determined to regularly travel between starting/ending location 1602 and travel destination 1604 along route 1606. Pick-up location 1608 may be a location to pick up items for relationship based fulfillment and drop-off location 1610 may be the location that the items are requested to be delivered to.

Pick-up location 1608 and drop-off location 1610 may be locations proximate to route 1606. Pick-up location 1608 and drop-off location 1610 may be nearby each other. Thus, when traveling from starting/ending location 1602 to travel destination 1604, the potential relationship based fulfillment provider may only need to detour slightly to pick-up location 1608, travel to drop-off location 1610, and then travel to travel destination 1604. Accordingly, the disturbance to the daily travel schedule of the user, for providing relationship based fulfillment, may be low. Such a determination may be made even though the user may be detected to be at starting/ending location 1602 (e.g., in the morning before the user has left the starting/ending location) and, thus, physically far away from both pick-up location 1608 and drop-off location 1610.

FIG. 16B illustrates example 1600B that includes a daily starting/ending location 1612, travel destination 1614, route 1616 to travel between starting/ending location 1612 and travel destination 1614, pick-up location 1618, and drop-off location 1620. In example 1600B, pick-up location 1618 may be far away from drop-location 1620. Nonetheless, the disturbance to the daily travel schedule of the user in example 1600B for providing relationship based fulfillment may be similar to that of the disturbance in example 1600A. Though pick-up location 1618 and drop-off location 1620 are far away, pick-up location 1618 is on route 1616 and, thus, pick-up would not be a great burden on the user providing relationship based fulfillment. Drop-off location 1620 is only a slight detour from route 1616 and/or a slight distance away from travel destination 1614. Thus, though the delivery distance between pick-up location 1618 and drop-off location 1620 is much greater than the distance between pick-up location 1608 and drop-off location 1610, the disturbance to the daily schedules of the users may be similar. Accordingly, in certain embodiments, the cost compensation for the user providing relationship based fulfillment in examples 1600A and 1600B may be similar and, assuming all other factors being equal, the user in example 1600A and 1600B may be similarly likely to be provided with the respective relationship based fulfillment opportunities.

Similarly, FIG. 16C illustrates example 1600C that includes a daily starting/ending location 1622, travel destination 1624, route 1626 to travel between starting/ending location 1622 and travel destination 1624, pick-up location 1628, and drop-off location 1630. In example 1600C, pick-up location 1628 is nearby travel destination 1624 while drop-off location 1630 is nearby daily starting/ending location 1622 (e.g., is a neighbor of the user). Thus, in example 1600C, unlike in examples 1600A and 1600B, it would be relatively inconvenient for the user to provide relationship based fulfillment while traveling from starting/ending location 1622 towards travel destination 1624. However, the platform (e.g., with the aid of machine learning techniques) may determine that the user may be able to provide relationship based fulfillment when traveling from travel destination 1624 to starting/ending location 1622 (e.g., when getting off of work) and that the delay in providing relationship based fulfillment of waiting until the user is traveling back towards starting/ending location 1622 is acceptable. For example, a machine learning device may be trained to determine the category of goods of the order for which relationship based fulfillment is requested and that such a category of goods (e.g., household items, books, water, and/or other such categories) is able to accept a delivery delay. Thus, the platform may then determine that the user in example 1600C is acceptable for providing relationship based fulfillment and, furthermore, that the disturbance to the daily travel schedule of the user in example 1600C is low, similar to that of examples 1600A and 1600B.

Figure 17:
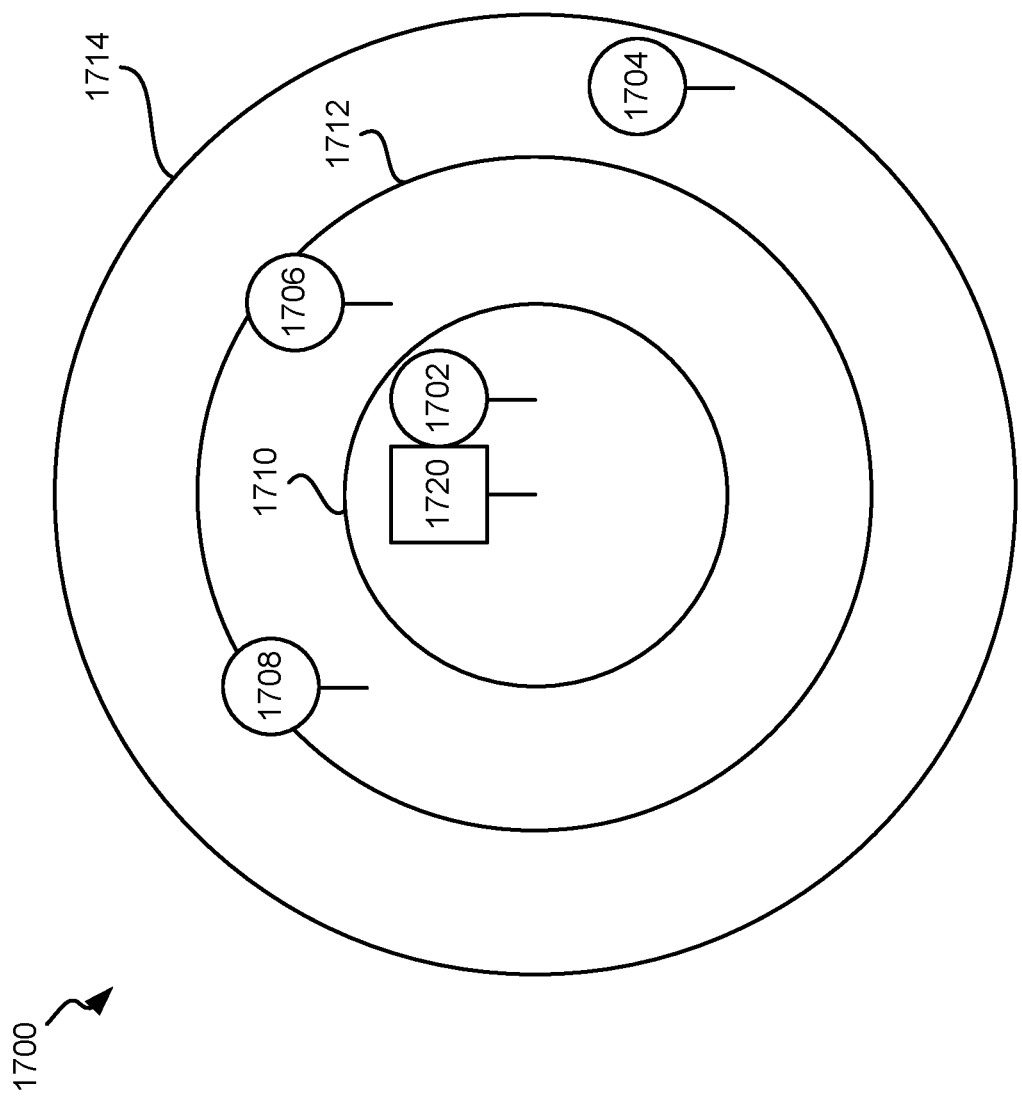
FIG. 17 illustrates an example of pick-up distance score determination, in accordance with some embodiments.
Figure 18:
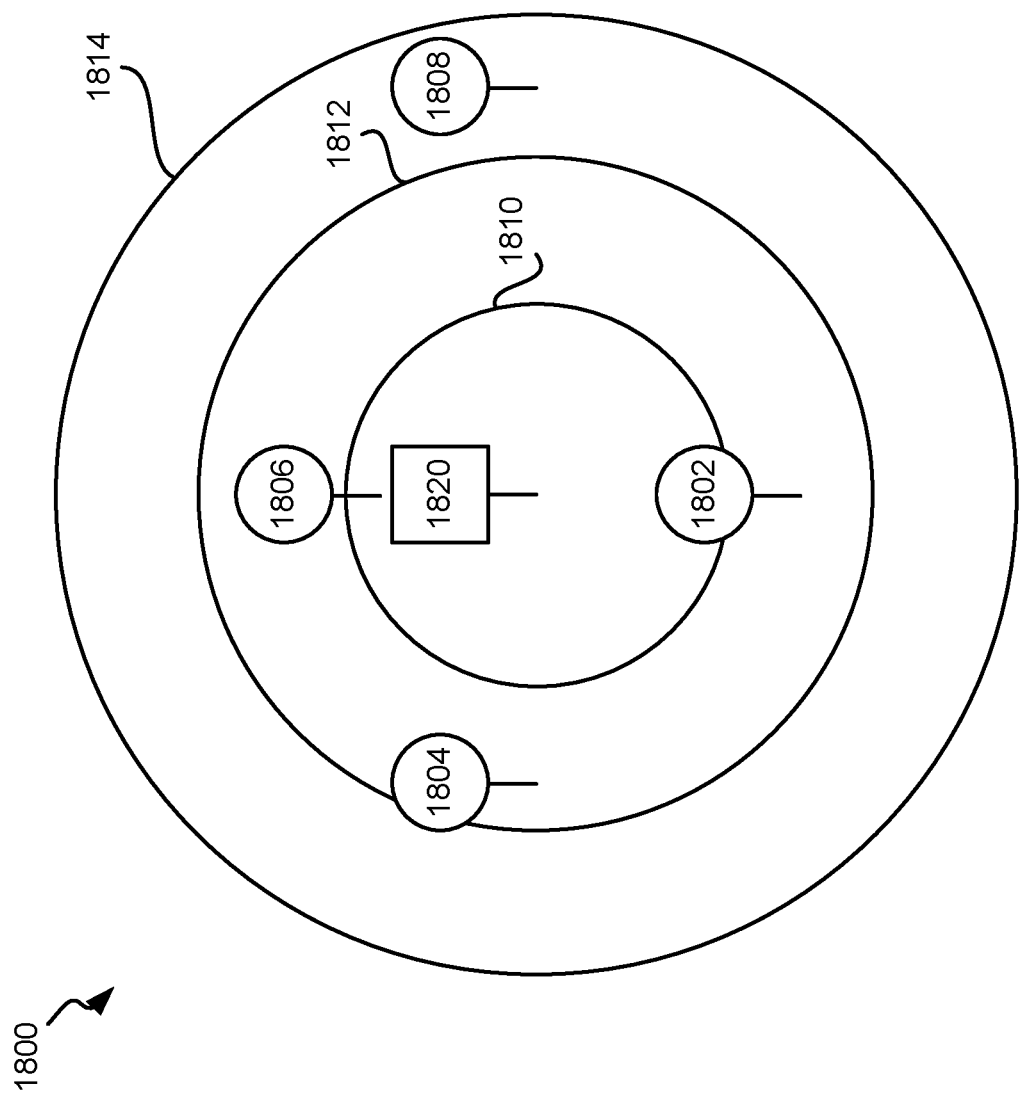
FIG. 18 illustrates an example of delivery disturbance score determination, in accordance with some embodiments.
Figure 19:
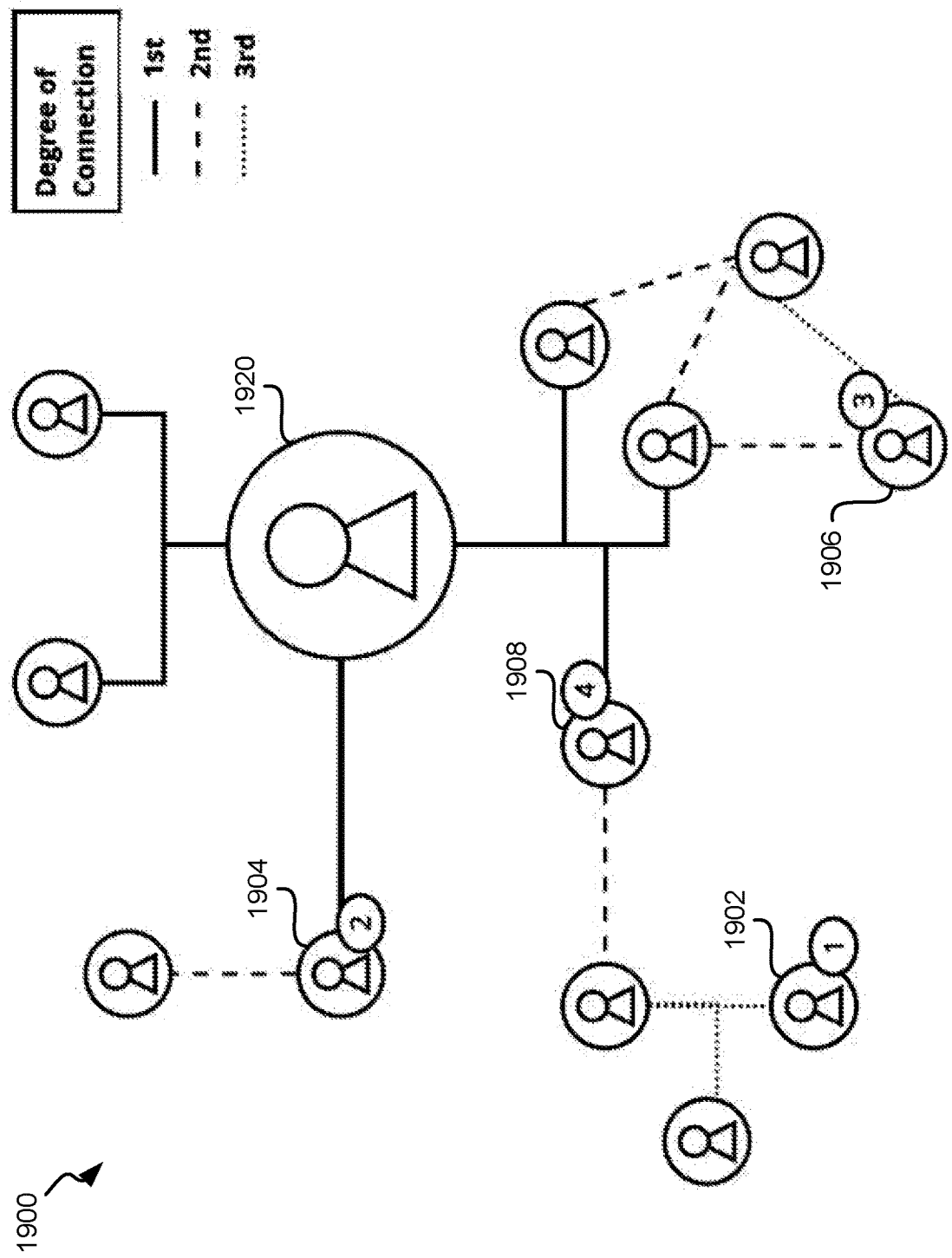
FIG. 19 illustrates an example of connection score determination, in accordance with some embodiments.

FIGS. 17-19 illustrate examples of determining scores for a user to provide relationship based fulfillment for various requests. In certain embodiments, the examples of FIGS. 17-19 may be utilized to determine various scores for users to provide relationship based fulfillment. Such scores may measure, for example, inconvenience to the user for providing relationship based fulfillment.

FIG. 17 illustrates an example of pick-up distance score determination, in accordance with some embodiments. FIG. 17 illustrates an example of determining a level of pick-up inconvenience to a user for performing relationship based fulfillment. In example 1700, user location 1720 may be a location of the user that is a potential relationship based fulfillment provider. In various embodiments, user location 1720 may be a current location of a user or may be a predicted location of a user at some future time (e.g., based on machine learning of the schedule of the user). In embodiments where user location 1720 is a predicted location, such a location may be fluid (e.g., along any portion of a forecasted route of the user). The distances from user location 1720 to pick-up locations 1702, 1704, 1706, and 1708 may thus be a relative distance from determined closest or most convenient (e.g., shortest amount of travel time) points along the determined route of the user.

As such, example 1700 may determine the travel distance or time from user location 1720 to locations 1702, 1704, 1706, and 1708. Thus, in various embodiments, example 1700 may be a distance plot (e.g., map), travel time plot, and/or a combination of both of how far or how much time is needed for the user to pick-up items for relationship based fulfillment from various locations.

The platform and/or machine learning techniques (e.g., based on data received for travel time from users of the platform) may determine that location 1702 is within distance/time zone 1710 and, thus, a minor inconvenience to the user based on the user's daily schedule. It may also determine that locations 1706 and 1708 are within distance/time zone 1712 and, thus, a moderate inconvenience to the user based on the user's daily schedule. It may further determine that location 1704 is within distance/time zone 1714 and, thus, a major inconvenience to the user based on the user's daily schedule. In certain embodiments, a score may be assigned based on the determined inconvenience (e.g., 1 for minor inconvenience, 2 for moderate inconvenience, and 3 for major inconvenience). In certain embodiments, some such scores may be disqualifying. Thus, for example, a determination of major inconvenience may disqualify the user from performing the associated fulfillment.

FIG. 18 illustrates an example of delivery disturbance score determination, in accordance with some embodiments. FIG. 18 illustrates an example of determining a level of delivery inconvenience to a user for performing relationship based fulfillment. In example 1800, user location 1820 may be a location of the user along a predicted route of the user.

In various embodiments, user location 1820 may be a current location of a user or may be a predicted location of a user at some future time during travel along a route (e.g., based on machine learning of the schedule of the user). Similar to example 1700, in example 1800, in embodiments where user location 1820 is a predicted location, such a location may be fluid (e.g., along any portion of a forecasted route of the user). The distances from user location 1820 to pick-up locations 1802, 1804, 1806, and 1808 may thus be a relative distance from determined closest or most convenient (e.g., shortest amount of travel time) points along the determined route of the user.

Example 1800 may determine the convenience of delivery for the user from user location 1820 to locations 1802, 1804, 1806, and 1808. As will be appreciated, though user location 1820 (as well as user location 1720) are shown as one location in example 1800 (and example 1700), in reality, user location 1820 may be associated with different locations for the fulfilment provided for each example fulfillment request associated with locations 1802, 1804, 1806, and 1808. As such, the distance traveled may have different starting points for each of the examples associated with locations 1802, 1804, 1806, and 1808, (as well as locations 1702, 1704, 1706, and 1708) though it is shown as the same starting location in example 1800 (as well as example 1700). For example, user location 1820 may correspond to the respective pick-up locations for the items associated with delivery to locations 1802, 1804, 1806, and 1808 or may correspond to how far out the user needs change the user's normal schedule in order to deliver to locations 1802, 1804, 1806, and 1808. As such, example 1800 may be a distance plot (e.g., map), travel time plot, and/or a combination of both of how far or how much time is needed for the user to deliver items for relationship based fulfillment from various locations.

The platform and/or machine learning techniques (e.g., based on data received for travel time from users of the platform) may determine that delivery to location 1806 is within distance/time zone 1810 and, thus, a minor inconvenience, delivery to locations 1802 and 1804 are within distance/time zone 1812 and, thus, a moderate inconvenience, and that delivery to location 1808 is within distance/time zone 1814 and, thus, a major inconvenience. In certain embodiments, a score may be assigned based on the determined inconvenience (e.g., 1 for minor inconvenience, 2 for moderate inconvenience, and 3 for major inconvenience). In certain embodiments, some such scores may be disqualifying. Thus, for example, a determination of major inconvenience may disqualify the user from performing the associated fulfillment.

FIG. 19 illustrates an example of connection score determination, in accordance with some embodiments. Example 1900 illustrates social connections between a potential relationship based fulfillment user 1920 and various requesting users 1902, 1904, 1906, and 1908. Thus, for example, requesting user 1902 may be a $3^{rd}$ level of connection from user 1920, requesting users 1904 and 1908 may be $1^{st}$ degrees of connection from user 1920, and requesting user 1906 may be a $2^{nd}$ degree of connection from user 1920. In certain embodiments, a score may be assigned based on the determined level of connection between user 1920 and the requesting users 1902, 1904, 1906, and 1908.

In certain embodiments, all three determinations of examples 1700, 1800, and 1900 may be performed for a user in response to a request for relationship based fulfillment. Thus, 1702, 1802, and 1902 may be associated with the same requesting user. Similarly, 1704, 1804, and 1904 may be associated with the same requesting user, 1706, 1806, and 1906 may be associated with the same requesting user, and 1708, 1808, and 1908 may be associated with the same requesting user. A total score, associated with the inconvenience of the relationship based fulfillment and the motivation for the candidate user to perform the relationship based fulfillment (e.g., based on the degree of connection between the candidate user and the requesting user) may be accordingly determined. Thus, for example, a combined score that includes the scores determined in examples 1700s, 1800s, and 1900s may be determined. In a certain embodiment, such an example score may include the inconvenience scores determined in examples 1700 and/or 1800 as well as a score associated with the degree of connection (e.g., a numerical score corresponding to the degree of connection). The combined score may be summed or otherwise determined (e.g., through a formula incorporating the scores as inputs) and output.

In certain embodiments, a lower score may indicate a relationship based fulfillment opportunity that is more attractive to a user. For embodiments where the scores are summed, such a score may be, for example, 6 (based on 1, 2, and 3 in examples 1700-1900) for the request associated with 1702-1902, 6 (based on 3, 2, and 1 in examples 1700-1900) for the request associated with 1704-1904, 5 (based on 2, 1, and 2 in examples 1700-1900) for the request associated with 1706-1906, and 6 (based on 2, 3, and 1 in examples 1700-1900) for the request associated with 1708-1908. In certain such embodiments, certain requests may be disqualified based on inconvenience and/or degree of connection. Thus, for example, the requests associated with 1704-1904 and 1708-1908 may be disqualified due to their inconvenience in pick-up or delivery, as described herein. In certain embodiments, any potential relationship based fulfillment candidate user may require a score below the threshold score in order to have the relationship based fulfillment opportunity provided to the user. In certain embodiments, such a score may include one, some, or all of the factors described herein.

Any of the disclosed embodiments may be embodied in various types of hardware, software, firmware, computer readable media, and combinations thereof. For example, some techniques disclosed herein may be implemented, at least in part, by non-transitory computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Java, Python, C++, C, HTML, any other markup language, JavaScript, ActiveX, VBScript, or Perl. Examples of non-transitory computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A non-transitory computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various embodiments have been described herein, it should be understood that they have been presented by way of example only, and not limitation. For example, some techniques and mechanisms are described herein in the context of fulfillment. However, the disclosed techniques apply to a wide variety of circumstances. Particular embodiments may be implemented without some or all of the specific details described herein. In other instances, well known process operations have not been described in detail in order not to unnecessarily obscure the techniques disclosed herein. Accordingly, the breadth and scope of the present application should not be limited by any of the embodiments described herein, but should be defined only in accordance with the claims and their equivalents.

What is claimed is:

1. A system comprising:
 a gateway, communicatively coupled to a network and configured to receive application data;
 a location module, configured to receive location data;
 a user database, configured to store user data associated with user members;
 a group database, configured to store group data, the group data directed to one or more association groups, each of the association groups comprising a plurality of user members;
 an association database, configured to store association data, the association data indicating relationships between one or more association groups and one or more user members, wherein the association data is determined and periodically updated based on application data and/or location data;
 a machine learning network, communicatively coupled to the location module and the user database, the machine learning network configured to perform a technique comprising:
  receiving, during a first time period, with the location module, and from a plurality of candidate user devices of a plurality of candidate user members, first candidate user location data;
  determining, based on the first candidate user location data, regular routes for each of the plurality of candidate user members;
  determining, based on the regular routes for each of the plurality of candidate user members, a regular route geofence for each of the plurality of candidate user members;
  receiving, during a second time period, with the location module, and from the plurality of candidate user devices of the plurality of candidate user members, second candidate user location data;
  refining, based on the second candidate user location data, the regular routes for each of the plurality of candidate user members; and
  refining, based on the refined regular routes for each of the plurality of candidate user members, the regular route geofence for each of the plurality of candidate user members, wherein the regular route geofence is independent of current locations of each of the plurality of candidate user members; and a processor, communicatively coupled to the gateway, the user data, the group database, the association database, and the location module, the processor configured to perform operations comprising:

receiving, with the gateway from a first user device associated with a first user, a first pick-up request, wherein the first pick-up request is associated with a first location, and wherein the first user is one of the user members;

determining that the first location is disposed within the refined regular route geofences for each of the plurality of candidate user members;

determining, with the processor and based on the first location being disposed within the regular route geofences for each of the plurality of candidate user members, a potential pick-up group comprising the plurality of candidate user members;

determining, with the processor and from the association data, relationship ratings between the first user and each of the plurality of candidate user members of the potential pick-up group;

determining, with the processor, a pick-up cost for each of the plurality of candidate user members of the potential pick-up group;

determining, with the processor and based on the pick-up costs, a first pick-up group from the plurality of candidate user members of the potential pick-up group; and providing, with the gateway, pick-up fulfillment data to the candidate user devices associated with each member of the first pick-up group.

2. The system of claim 1, wherein the technique further comprises:

receiving, with the location module and from the plurality of candidate user devices of the plurality of candidate user members, first candidate current user location data;

determining, based on the first candidate current user location data, current locations for each of the plurality of candidate user members;

receiving, during the first time period, with the gateway, and from the plurality of candidate user devices of the plurality of candidate user members, first candidate sensor data;

determining, based on the first candidate sensor data, modes of movement of each of the plurality of candidate user members; and determining candidate user geofences around the current locations of each of the plurality of candidate user members, wherein sizes of the candidate user geofences are based on the determined mode of movement of each respective candidate user member.

3. The system of claim 2, wherein the first candidate user location data is a portion of the user data.

4. The system of claim 2, wherein the operations further comprise:

determining that the first location is disposed within the candidate user geofences for each of the plurality of candidate user members, wherein the potential pick-up group is determined based further on the first location being disposed within the candidate user geofences for each of the plurality of candidate user members.

5. The system of claim 1, wherein the regular routes are daily travel routes of each of the plurality of candidate user members.

6. The system of claim 5, wherein the regular routes are associated with a day of a week, wherein the first pick-up request is associated with the day of the week, and wherein the operations further comprise:

determining that the day of the week that the regular routes are associated with is the same day of the week that the first pick-up request is associated with.

7. The system of claim 1, wherein the first pick-up group is further determined based on the relationship ratings.

8. The system of claim 1, wherein the operations further comprise:

determining, with the processor, that a first threshold response condition has been met;

determining, with the processor and based on the pick-up costs, a second pick-up group from the candidate user members of the potential pick-up group; and providing, with the gateway, pick-up fulfillment data to candidate user devices associated with each of the candidate user members of the second pick-up group.

9. The system of claim 8, wherein the operations further comprise:

receiving, with the gateway, a first pick-up fulfillment acceptance from a first candidate user device of a first candidate user member of the first pick-up group; and confirming, with the gateway, the pick-up fulfillment acceptance of the first candidate user member.

10. The system of claim 9, wherein the operations further comprise:

receiving, with the gateway, a second pick-up fulfillment acceptance from a second candidate user device of a second candidate user member of the first pick-up group; and selecting, with the processor, the first candidate user member for pick-up fulfillment.

11. The system of claim 8, wherein the operations further comprise:

determining, with the processor, that a second threshold response condition has been met; and providing, with the gateway, credit confirmation data to the first user for self-fulfillment.

12. The system of claim 1, wherein the user data further comprises user interest data, and wherein the pick-up cost for each of the candidate user members of the potential pick-up group is determined based further on the user interest data.

13. A system comprising:

a gateway, communicatively coupled to a network and configured to receive application data;

a location module, configured to receive location data;

a user database, configured to store user data associated with user members;

a group database, configured to store group data, the group data directed to one or more association groups, each of the association groups comprising a plurality of user members;

an association database, configured to store association data, the association data indicating relationships between one or more association groups and one or more user members, wherein the association data is determined and periodically updated based on application data and/or location data;

a machine learning network, communicatively coupled to the location module and the user database, the machine learning network configured to perform a technique comprising:
- receiving, during a first time period, with the location module, and from a plurality of candidate user devices of a plurality of candidate user members, first candidate user location data;
- determining, based on the first candidate user location data, regular routes for each of the plurality of candidate user members;
- determining, based on the regular routes for each of the plurality of candidate user members, a regular route geofence for each of the plurality of candidate user members;
- receiving, during a second time period, with the location module, and from the plurality of candidate user devices of the plurality of candidate user members, second candidate user location data;
- refining, based on the second candidate user location data, the regular routes for each of the plurality of candidate user members; and
- refining, based on the refined regular routes for each of the plurality of candidate user members, the regular route geofence for each of the plurality of candidate user members, wherein the regular route geofence is independent of current locations of each of the plurality of candidate user members; and a processor, communicatively coupled to the gateway, the user data, the group database, the association database, and the location module, the processor configured to perform operations comprising:
- receiving, with the gateway and from a first user device associated with a first user, a first pick-up request, wherein the first pick-up request is associated with a first location, and wherein the first user is one of the user members;
- determining that the first location is disposed within the refined regular route geofences for each of the plurality of candidate user members;
- receiving, with the gateway, availability data from the plurality of candidate user devices of the plurality of candidate user members;
- determining, with the processor and based on the availability data and the refined regular route geofences of each of the plurality of candidate user members, a predicted location for each of the plurality of candidate user members;
- determining, with the processor and based on the predicted location, a pick-up cost for each of the plurality of candidate user members;
- determining, with the processor and based on the pick-up costs, a first group and a second group from the plurality of candidate user members; and
- providing, with the gateway, pick-up fulfillment data to electronic devices associated with each of the candidate user members of the second group.

14. The system of claim 13, wherein the operations further comprise:
determining, with the processor and from the association data, relationship ratings between the first user and each of the candidate user members of the first group, wherein the pick-up costs are further determined based on the relationship ratings.

15. The system of claim 13, wherein the predicted location is determined based on the user data stored within the user database.

16. The system of claim 15, wherein the predicted location comprises a home and/or work address associated with at least one of the candidate user members of the first group.

17. The system of claim 15, wherein the predicted location comprises a regular user route for at least one of the candidate user members of the first group.

18. The system of claim 13, wherein the availability data comprises data indicating that the plurality of candidate user devices of the plurality of candidate user members comprises a first application that is active.

19. The system of claim 13, wherein the operations further comprise:
receiving, with the gateway, a first pick-up fulfillment acceptance from a first electronic device of a first candidate user member of the second group; and
confirming, with the gateway, the pick-up fulfillment acceptance of the first candidate user member.

20. the system of claim 13, wherein the regular routes are daily travel routes of each of the plurality of candidate user members.

* * * * *